United States Patent
Mizuno

(10) Patent No.: US 7,539,946 B2
(45) Date of Patent: May 26, 2009

(54) SERVICE PROCESSING APPARATUS AND SERVICE PROCESSING METHOD

(75) Inventor: Takafumi Mizuno, Higashi Murayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 11/353,694

(22) Filed: Feb. 14, 2006

(65) Prior Publication Data
US 2006/0190604 A1    Aug. 24, 2006

(30) Foreign Application Priority Data
Feb. 17, 2005 (JP) .............................. 2005-041055

(51) Int. Cl.
*G06F 15/00*    (2006.01)
*G06F 13/00*    (2006.01)
(52) U.S. Cl. ...................................... 715/763; 715/765
(58) Field of Classification Search ......... 715/763–765, 715/840–845, 741–750; 348/238–239; 358/446, 358/448
See application file for complete search history.

(56) References Cited

U.S. PATENT DOCUMENTS 7,266,590 B2 * 9/2007 Nakaoka et al. ............. 709/219

2003/0137693 A1 * 7/2003 Nishio ....................... 358/1.15
2003/0195926 A1    10/2003 Miyazaki

FOREIGN PATENT DOCUMENTS

JP    10-200676 A    7/1998
JP    2003-309696 A    10/2003

OTHER PUBLICATIONS

The above reference were cited in on Oct. 28, 2008 Japanese Office Action that issued in Japanese Patent Application 2005041055.

* cited by examiner

*Primary Examiner*—Kevin Nguyen
(74) *Attorney, Agent, or Firm*—Cowan, Liebowitz & Latman, P.C.

(57) ABSTRACT

In the present invention, in the case where distributed services are brought into cooperation among a plurality of service processing apparatuses, no instruction will be prepared in advance or no instruction is needed to be prepared again in the case where a novel function is added as well. And a combination of functions is controlled for selection and display corresponding with a selection, enabling a utilizer to select an appropriate combination of services in a short period of time without perplexing the utilizer. They provide a service processing apparatus as well as a service processing method capable of alleviating a burden onto operators and increasing convenience.

18 Claims, 16 Drawing Sheets

FIG. 3

401 — Device ID
ABC12345

402 — IP Address
168.54.69.221

403 — FUNCTION No.
9642

404 — NAME
MAIL TRANSMISSION

405 — ITEMS THAT MUST BE BROUGHT INTO ACTION IN ADVANCE
338

406 — ITEMS THAT HAD BETTER BE BROUGHT INTO ACTION IN ADVANCE
1621.6834

407 — ITEMS THAT HAD BETTER BE BROUGHT INTO ACTION AFTERWARD

408 — RECOMMENDED ACTIONS
[MAIL TRANSMISSION OF COMPRESSED DATA] 338 → 9621

409 — FUNCTION No.
1454

NAME
SERVICE A2

ITEMS THAT MUST BE BROUGHT INTO ACTION IN ADVANCE

ITEMS THAT HAD BETTER BE BROUGHT INTO ACTION IN ADVANCE
554

ITEMS THAT HAD BETTER BE BROUGHT INTO ACTION AFTERWARD
1021

RECOMMENDED ACTIONS

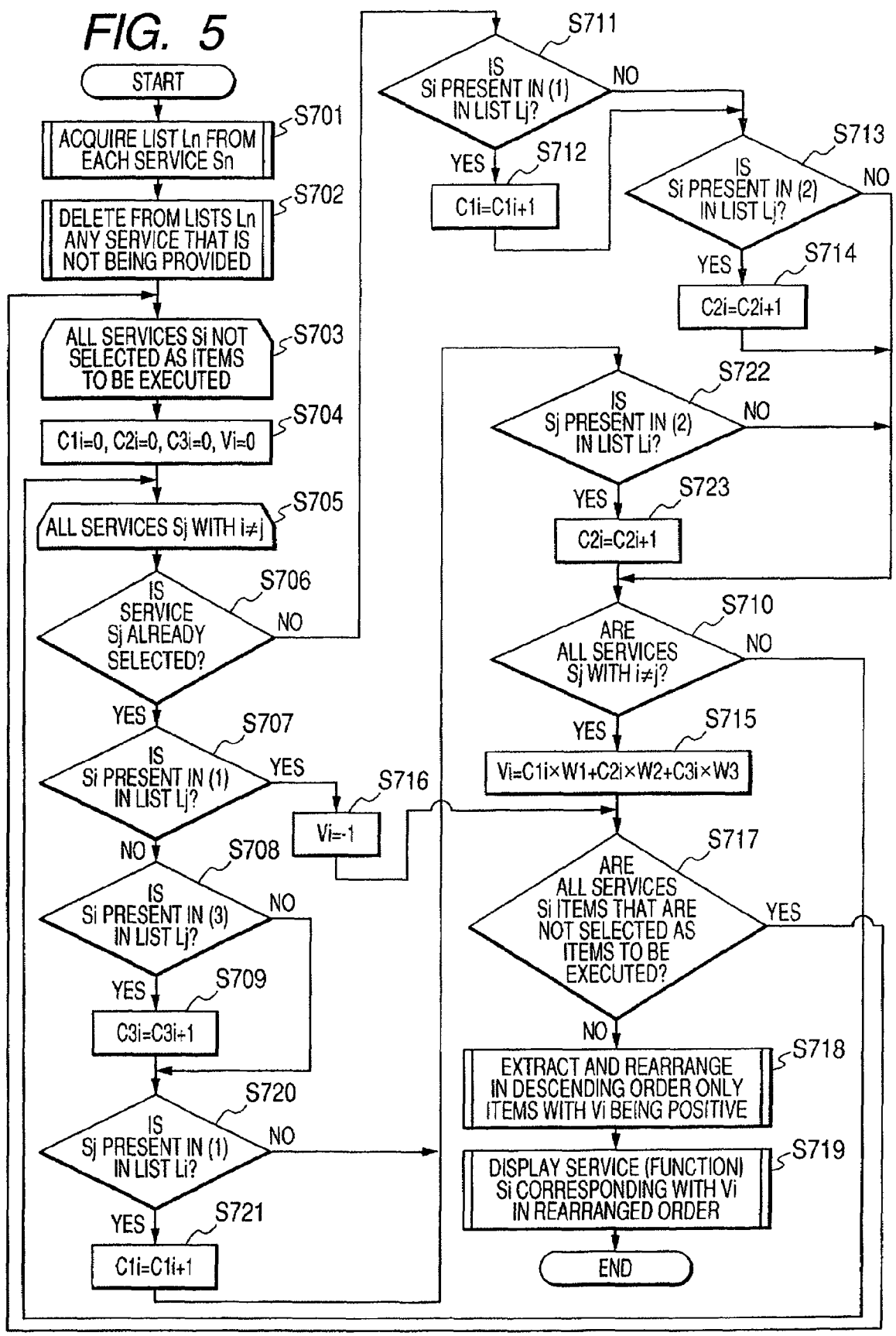

FIG. 6

```xml
<?xml version="1.0"?>
<ServiceList>
    <DeviceID>ABC12345</DeviceID>                801
    <IPAddress>168.59.69.221</IPAddress>
    <Service ID="9642">
        <Name>TRANSMIT MAIL</Name>               802
        <MustExecuteBefore>
            <ID>338</ID>
        </MustExecuteBefore>
        <ExecuteBefore>
            <ID>1621</ID>
            <ID>6834</ID>
        </ExecuteBefore>
        <ExecuteAfter/>
        <Recommend>
            <Action name="yyy">
                <Order no="1">338</Order>
                <Order no="2">9642</Order>
            </Action>
        </Recommend>
    </Service>
    <Service>
    . . . . . . . . . . . . .
    </Service>
</ServiceList>
```

FIG. 7

```xml
<?xml version="1.0"?>
<Service no="1" ID="9642">
    <DeviceID>ABC12345</DeviceID>
    <IPAddress>111.222.123.234</IPAddress>
    <Name>xxx</Name>
    <MustExecuteBefore>
        <ID>338</ID>
    </MustExecuteBefore>
    <ExecuteBefore>
        <ID>1621</ID>
        <ID>6834</ID>
    </ExecuteBefore>
    <ExecuteAfter/>
    <Recommend>
        <Action name="yyy">
            <Order no="1">338</Order>
            <Order no="2">9642</Order>
        </Action>
    </Recommend>
</Service>
```

NAME
    PDF CONVERSION
(1) ITEMS THAT MUST BE BROUGHT INTO ACTION IN ADVANCE
    (NONE)
(2) ITEMS THAT HAD BETTER BE BROUGHT INTO ACTION IN ADVANCE
    (NONE)
(3) ITEMS THAT HAD BETTER BE BROUGHT INTO ACTION AFTERWARD
    MAIL TRANSMISSION, ENCODING

L2 1402

NAME
    MAIL TRANSMISSION
(1) ITEMS THAT MUST BE BROUGHT INTO ACTION IN ADVANCE
    (NONE)
(2) ITEMS THAT HAD BETTER BE BROUGHT INTO ACTION IN ADVANCE
    PDF CONVERSION
(3) ITEMS THAT HAD BETTER BE BROUGHT INTO ACTION AFTERWARD
    (NONE)

L3 1403

NAME
    ELECTRONIC SIGNATURE
(1) ITEMS THAT MUST BE BROUGHT INTO ACTION IN ADVANCE
    PDF CONVERSION
(2) ITEMS THAT HAD BETTER BE BROUGHT INTO ACTION IN ADVANCE
    (NONE)
(3) ITEMS THAT HAD BETTER BE BROUGHT INTO ACTION AFTERWARD
    (NONE)

L4 1404

NAME
    OCR
(1) ITEMS THAT MUST BE BROUGHT INTO ACTION IN ADVANCE
    (NONE)
(2) ITEMS THAT HAD BETTER BE BROUGHT INTO ACTION IN ADVANCE
    (NONE)
(3) ITEMS THAT HAD BETTER BE BROUGHT INTO ACTION AFTERWARD
    TRANSLATION

NAME
　　PDF CONVERSION
(1) ITEMS THAT MUST BE BROUGHT INTO ACTION IN ADVANCE
　　(NONE)
(2) ITEMS THAT HAD BETTER BE BROUGHT INTO ACTION IN ADVANCE
　　(NONE)
(3) ITEMS THAT HAD BETTER BE BROUGHT INTO ACTION AFTERWARD
　　MAIL TRANSMISSION

L2 1502

NAME
　　MAIL TRANSMISSION
(1) ITEMS THAT MUST BE BROUGHT INTO ACTION IN ADVANCE
　　(NONE)
(2) ITEMS THAT HAD BETTER BE BROUGHT INTO ACTION IN ADVANCE
　　PDF CONVERSION
(3) ITEMS THAT HAD BETTER BE BROUGHT INTO ACTION AFTERWARD
　　(NONE)

L3 1503

NAME
　　ELECTRONIC SIGNATURE
(1) ITEMS THAT MUST BE BROUGHT INTO ACTION IN ADVANCE
　　PDF CONVERSION
(2) ITEMS THAT HAD BETTER BE BROUGHT INTO ACTION IN ADVANCE
　　(NONE)
(3) ITEMS THAT HAD BETTER BE BROUGHT INTO ACTION AFTERWARD
　　(NONE)

L4 1504

NAME
　　OCR
(1) ITEMS THAT MUST BE BROUGHT INTO ACTION IN ADVANCE
　　(NONE)
(2) ITEMS THAT HAD BETTER BE BROUGHT INTO ACTION IN ADVANCE
　　(NONE)
(3) ITEMS THAT HAD BETTER BE BROUGHT INTO ACTION AFTERWARD
　　(NONE)

FIG. 14

```xml
<?xml version="1.0"?>
<Service no="1" ID="9642">
    <DeviceID>ABC12345</DeviceID>
    <IPAddress>111.222.123.234</IPAddress>
    <Name>xxx</Name>
    <MustExecuteBefore>
        <ID>338</ID>
    </MustExecuteBefore>
    <ExecuteBefore>
        <ID>1621</ID>
        <ID>6834</ID>
    </ExecuteBefore>
    <ExecuteAfter/>
    <Recommend>                                    ─1302 ─1301
        <Action name="xxx">
            <Order no="1">338</Order>
            <Order no="2">9642</Order>
        </Action>
                                                   ─1303
        <Action name="yyy">
            <Order no="1">9642</Order>
            <Order no="2">10004</Order>
        </Action>
                                                   ─1304
        <Action name="zzz">
            <Order no="1">9621</Order>
            <Order no="2">9642</Order>
            <Order no="3">52</Order>
        </Action>
    </Recommend>
</Service>
```

FIG. 15

```xml
<?xml version="1.0"?>
<Service no="1" ID="9642">
    <DeviceID>ABC12345</DeviceID>
    <IPAddress>111.222.123.234</IPAddress>
    <Name>xxx</Name>
    <MustExecuteBefore>
        <ID>338</ID>
    </MustExecuteBefore>
    <ExecuteBefore>
        <ID>1621</ID>
        <ID>6834</ID>
    </ExecuteBefore>
    <ExecuteAfter/>
    <Prohibit>                          1601
        <ID>442</ID>
        <ID>6975</ID>
    </Prohibit>
    <Recommend>
        <Action name="yyy">
            <Order no="1">338</Order>
            <Order no="2">9642</Order>
        </Action>
    </Recommend>
</Service>
```

FIG. 17

```xml
<?xml version="1.0"?>
<Service no="1" ID="9642">
    <DeviceID>ABC12345</DeviceID>
    <IPAddress>111.222.123.234</IPAddress>
    <Name>xxx</Name>
    <AvailableFormat>
        <Format type="image">
            <SubFormat>JPEG</SubFormat>
            <SubFormat>PNG</SubFormat>
        </Format>
    </AvailableFormat>
    <ResultFormat>
        <Format type="PDF"/>
    </ResultFormat>
    <MustExecuteBefore>
        <ID>338</ID>
    </MustExecuteBefore>
    <ExecuteBefore>
        <ID>1621</ID>
        <ID>6834</ID>
    </ExecuteBefore>
    <ExecuteAfter/>
    <Prohibit>
        <ID>442</ID>
        <ID>6975</ID>
    </Prohibit>
    <Recommend>
        <Action name="yyy">
            <Order no="1">338</Order>
            <Order no="2">9642</Order>
        </Action>
    </Recommend>
</Service>
```

1801 — AvailableFormat block
1802 — ResultFormat block

MEMORY MAP OF STORAGE MEDIA

SERVICE PROCESSING APPARATUS AND SERVICE PROCESSING METHOD

BACKGROUND OF THE INVENTION

1. Field of the Invention

The present invention relates to a service processing apparatus as well as a service processing method in which a number of service processing apparatuses perform processing using distributed functions in cooperation and storage media having computer readable programs stored thereon and programs thereof.

2. Related Background Art

Conventionally, a service processing system of this type tends to have a plurality of functions such as a printing function from a personal computer, a scanner function of taking a paper manuscript into a personal computer and a facsimile function of implementing facsimile transmission in addition to a function of implementing photocopying from a paper manuscript due to, for example, enhancement in performance in a photocopier as a device.

Moreover, the functions to be provided have been widened to cover a variety of types such as a function of implementing image processing to implement format conversion, a mailing function of transmitting electric mail and an OCR function of implementing character recognition.

In addition, the above described functions are not processed not only by photocopiers but also occasionally by a server that is provided separately.

Suppose, for example, as shown in FIG. 20, a photocopier 202, a photocopier 203 and a photocopier 204 are connected to a network 201. The photocopier 202 has a function 204 corresponding with a function A1 as well as a function 205 corresponding with a function A2 while the photocopier 203 has a function 207 corresponding with a function B1.

FIG. 20 is a block diagram of describing an example of an image processing system to which a service processing system of this type is applicable, exemplifying a system where a plurality of image processing apparatuses are configured capable of communication on a network.

Photocopiers, which might be configured thus and connected to a network, could not utilize the respective functions except a dedicated photocopier retaining the respective functions and no cooperation was feasible between photocopiers on the network.

For example, the photocopier 204 had no function and therefore could not utilize any function of the photocopier 202 and the photocopier 203 being present on the same network. Moreover, such an arrangement that brings the functions B1 of the photocopier 203 and the function A2 of the photocopier 202 into cooperation to implement processing serially used to be unfeasible.

Therefore, in recent years, in order to execute a series of a plurality of processing, such a method of configuring a service on a functional unit basis to implement processing on a service unit basis (for example, a Web service and the like) have been being utilized wider and wider and a plurality of functions, that are combined and are brought into cooperation, is being implemented.

Here, a Wev service means a technology of bringing an autonomous application on a network into cooperation with message exchange or that application.

Here, a photocopier 302, a photocopier 303 and a photocopier 304 are connected onto a network 301. The photocopier 302 and the photocopier 303 provide apparatuses on the network with functions that are inherent in them as service.

That is, the photocopier 302 provides two services of a service A1 (service 304) as function and a service A2 (service 305) as function while the photocopier 303 provides a service B1 (service 307) as function. In addition, the photocopiers 302, 303 and 304 respectively have a function capable of determining which apparatuses can execute what kind of service.

Under such circumstances, the photocopier 304 having no function can be made to utilize a function of another photocopier as service, the service A2 of the photocopier 302 can be brought into cooperation after the service B1 of the photocopier 303 has been processed and the like.

In order to realize such cooperated operations, a utilizer used to designate, in advance, order of bringing functions such as scanning, printing and facsimile, etc. into cooperation to prepare an instruction for execution along the order.

However, preparation of an instruction in advance would result in an enormous number of instructions for setting, giving rise to such a problem of requiring a lot of time to look up a target instruction among them.

In order to solve this problem, a technology of authenticating a utilizer and searching for an instruction corresponding with that utilizer based on (authentication) information of the utilizer and authorization information is disclosed, for example, in Japanese Patent Application Laid-Open No. 2003-288067.

However, the above described prior art requires preparation of an instruction in advance, and, in a case where a novel function is added, the instruction needs to be prepared all over again, which has been burdening the utilizer.

In addition, also in the case where no novel function is added, the instruction has been prepared in advance, such a slight change as a change in order of execution of functions cannot be dealt with in a flexible fashion.

In addition, in the case where a utilizer designates functions in order without utilizing the above described prior art and without preparing an instruction, an increase in function and service will result in an increase in the amount of their combination to make it difficult for the utilizer to select an appropriate combination, giving rise to a problem.

SUMMARY OF THE INVENTION

In the present invention, in the case where distributed services are brought into cooperation among a plurality of service processing apparatuses, no instruction will be prepared in advance or no instruction is needed to be prepared again in the case where a novel function is added as well. And a combination of functions is controlled for selection and display corresponding with a selection, enabling a utilizer to select an appropriate combination of services in a short period of time without perplexing the utilizer. They provide a service processing apparatus as well as a service processing method capable of alleviating a burden onto operators and increasing convenience.

In order to attaining the above described objects, according to a first aspect of the present invention, a service processing apparatus capable of communicating with respective apparatuses distributed on a network and utilizing, as service, functions providable at respective apparatuses, having:

an obtaining unit adapted to obtain service information including cooperation information on individual services provided from respective apparatuses;

a determining unit of determining priorities of respective services to be displayed onto a display portion from cooperation information of respective services based on service information of respective apparatuses obtained by said obtaining unit; and a control unit of displaying respective services onto the display portion based on priorities determined by said determining unit.

In order to attaining the above described objects, according to a second aspect of the present invention, a service display method in a service processing apparatus capable of communicating with respective apparatuses distributed on a network and utilizing, as service, functions providable at respective apparatuses, having:

an obtaining step of obtaining service information including cooperation information on individual services provided from respective apparatuses;

a determining step of determining priorities of respective services to be displayed onto a display portion from cooperation information of respective services based on service information of respective apparatuses obtained by said obtaining step; and a control step of displaying respective services onto the display portion based on priorities determined by said determining step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a drawing exemplifying a service list that the image processing apparatus shown in FIG. 2 gets back from another image processing apparatus;

FIG. 5 is a flow chart exemplifying a first data processing procedure of the image processing apparatus in the embodiment hereof;

FIG. 6 is a drawing of describing a data structure of a list of functions shown in FIG. 3;

FIG. 7 is a drawing exemplifying a list of services generated from a device inherent information portion and a service portion shown in FIG. 6;

FIG. 10 is a drawing exemplifying services utilizable with the image processing system shown in FIG. 1;

FIG. 11 is a drawing exemplifying services utilizable with the image processing system shown in FIG. 1;

FIG. 14 is a drawing exemplifying a list of services in the image processing apparatus in the embodiment hereof;

FIG. 15 is a drawing exemplifying a service list undergoing processing with the image processing apparatus showing a second embodiment of the present invention;

FIG. 17 is a drawing exemplifying a service list in the image processing apparatus showing the embodiment hereof;

DETAILED DESCRIPTION OF THE PREFERRED EMBODIMENTS

Preferred embodiments of the present invention will now be described in detail in accordance with the accompanying drawings.

Next, the best mode for embodying the present invention will be described with reference to the drawings.

(Description of System Configuration)

First Embodiment

Figure 1:
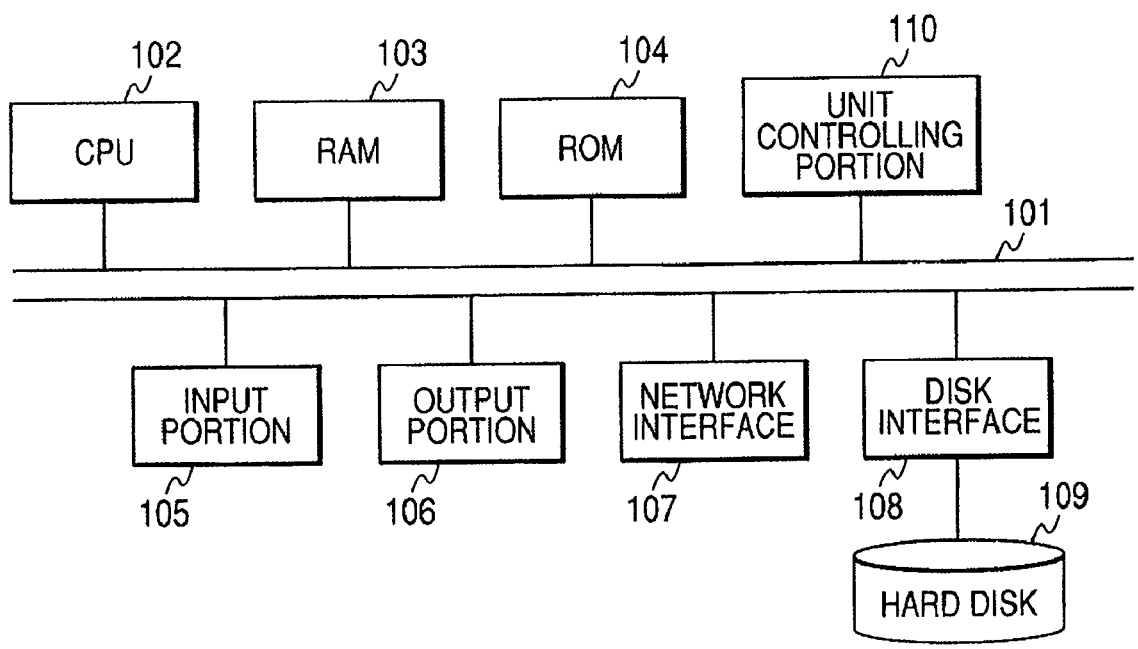
FIG. 1 is a block diagram of describing a configuration of an image processing apparatus to which a service processing apparatus showing a first embodiment of the present invention is applicable.

FIG. 1 is a block diagram of describing a configuration of an image processing apparatus to which a service processing apparatus showing a first embodiment of the present invention is applicable and which is configured capable of communication with another image processing apparatus through a network. Here, in the present embodiment, an example of taking an image processing apparatus comprising composite functions as a device (service processing apparatus) on a network will be described, nevertheless the device example will not be limited to image processing apparatuses, but anything will do if it is a network appliance and a device different in function configuration and is capable of bringing services and functions that respective devices can provide into cooperation. Here, the service processing apparatus may be the one that the data processing apparatus provides through functions (for example, a function as a WEB service) of a predetermined OS.

In FIG. 1, respective kinds of devices described below are brought into connection on a bus 101. A CPU 102 implements respective kinds of controls and operations onto inherent functions such as printing processing at the time of printing and image processing at the time of scanning. A RAM 103 allowing extension of capacity is a volatile memory where operation results of the CPU 102 and image data as well as font data for printing and scanning are stored.

A ROM 104 is nonvolatile memory, where programs and font data etc. for bringing the CPU 102 into operation are stored. Here, the ROM 104 may be rewritable like a flash memory. In addition, the programs of bringing the CPU 102 into operation may be present on the RAM 103.

An input portion 105 includes a keyboard and a pointing device etc. and receives a variety of instructions for a user. This is not depicted in FIG. 1 and processes input information from such as a touch screen mounted onto image processing apparatus. The output portion 106 is to implement information display for receiving states or functions of the image processing apparatus and instruction from a user and is configured by, for example, an LCD display etc.

Likewise, it is not depicted in FIG. 1, but the input portion 105 and the output portion 106 may be configured by a touch panel portion and a screen portion mounted onto the image processing apparatus so as to display the input information etc. The network interface 107 implements connection to an outside network such as LAN etc. Through the network interface 107, exchange of data such as images etc. and a variety of data processing by execution of applications with another device or a predetermined OS is implemented with computers on a network.

The disk interface 108 is connected to the hard disk 109. In the hard disk 109, data that should be stored, such as image data and programs, etc. are held in storage.

In addition, the data stored in the hard disk 109 are read by the RAM 103 by the instruction from the CPU 102 in accordance with necessity and are utilized. In addition, the hard disk 109 is not limited to a single unit but may be present in plurality on the system.

Apparatuses in charge of respective kinds of functions such as printing, scanning and facsimile mounted onto the image processing apparatus are connected to the unit controlling portion 110. The unit controlling portion 110 may be present individually on a functional unit basis.

Here, the image processing apparatus is not limited to the above described hardware configuration if it comprises an input interface portion, a display portion and a network interface and can communicate with services provided by outside apparatuses.

In the present embodiment, functions are exchanged as services among respective image processing apparatuses.

In FIG. 1, the program of processing services is in storage in the hard disk 109. This may be in storage in the ROM 104. In addition, it may be the one acquired from a server etc. through a network.

Figure 2:
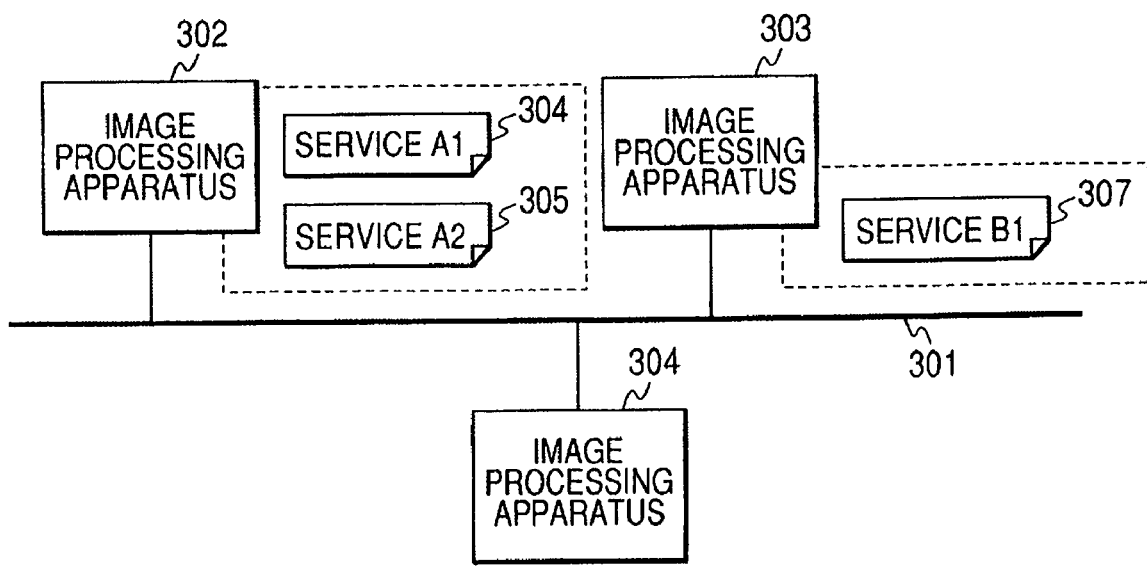
FIG. 2 is a block diagram of describing a configuration allowing functions to be brought into cooperation with the image processing system where the image processing apparatus shown in FIG. 1 is utilized.

The CPU 102 receives from the network interface 107 a service list of an outside device (in the present embodiment, an image processing apparatus to be taken as shown in FIG. 2) in a data format with a redetermined protocol, provides the image processing apparatus as an outside device with its own inherent functions as a service or makes an order on a service to an outside device. At this time, the CPU 102 displays service information onto the display portion 106 and processing such as selection of a user's desired service etc. from the input portion 105 is implemented as well.

FIG. 2 is a block diagram of describing a configuration allowing functions to be brought into cooperation with the image processing system where the image processing apparatus shown in FIG. 1 is utilized. Acquisition of a service list in the image processing apparatus will be described with reference to FIG. 2 as follows.

In FIG. 2, for example, in the case where the image processing apparatus 304 knows of a service of another image processing apparatus as another device, broadcast message of requesting a service list together with its own IP address is transmitted to the network from the image processing apparatus 304 in a predetermined protocol. Broadcast is to transmit data to the general public within a network. It is implemented by designating a special address meaning the network in its entirety. Broadcast is used for a limited purpose in TCP/IP such as in case of searching for a server having setting information at the time of obtaining setting information automatically by connection to the network. In addition, transmission of data to the general public by designating a single address is called unicast while transmission of data by designating a plurality of counterparts is called multicast.

Respective devices (including the image processing apparatuses 302 and 303) on the network that this broadcast message has reached make determination on presence functions (services) providable to them with their own determination programs (in storage in, for example, hard disks etc.), and in the case where presence is determined, returns a service list to the IP address of the target device that has delivered the broadcast message in a predetermined protocol.

For example, in case of the image processing apparatus 302, it delivers, to the image processing apparatus 304, a service list on the service 305 specifying the service A1 and the service 306 specifying the service A2. In addition, in case of the image processing apparatus 303, it delivers, to the image processing apparatus 304, the service list on the service 307 specifying the service B1.

Here, the image processing system shown in FIG. 2 is an example of communication with any image processing apparatus by the broadcast message, not broadcast message but inquiry on service may be arranged to be implemented only with a device of not broadcast message but a specific IP address so as to, thereby, reduce network traffic or to acquire updated information on service that the specific device provides.

FIG. 3 is a drawing exemplifying a service list returned from another image processing apparatus to the image processing apparatus 304 having been shown in FIG. 2, but here the example hereof presents an example where a service list has undergone conceptualization, and an actual format may use a general-purpose format, for example, such as XML, or anything will do if it is a format, which is recognizable between respective devices, such as format in a binary form subject to determination of format in advance.

In FIG. 3, reference numeral 401 denotes a device ID of showing an inherent value of a device. For example, in case of an image processing apparatus, it denotes an ID set for each image processing apparatus. Reference numeral 402 denotes an IP address of the image processing apparatus. If a plurality of network interfaces are present and IP address is different in service, the present embodiment issues a service list on an IP address unit basis. However, without being limited hereto, such a mechanism that makes a plurality of IP addresses describable in one service list.

In addition, for example, in the case, for example, where an image processing apparatus is provided with a JAVA platform environment, A Web service can be provided as a JAVA program. In this case, the list in FIG. 3 is described into a file called manifest. In case of this JAVA environment, the manifest file is described in an XML format.

The foregoing is information on the image processing apparatus as a device, but information related to devices such as model names and format information etc. not shown herein may be arranged to be described.

Reference numerals 403 to 408 denote service description portions on respective services. A service description portion 403 undergoes description of an ID uniquely set to a service. In an example shown in FIG. 3, it is "9642". In addition, the service description portion 404 undergoes description of the title of that service. In the example shown in FIG. 3, it is "mail transmission".

A service description portion 405 undergoes description of an ID list of services to be brought into operation beforehand. In the case where identification (ID) described here has not yet been implemented in advance, this service cannot be executed. In an example shown in FIG. 3, "338" needs to be executed in advance.

Here, the service description portion 405 allows description of a plurality of IDs. A service description portion 406 is an ID list on items that had better undergo operations in advance. In an occasion of executing this service, a list of IDs, that do not necessarily have to undergo execution but had better undergo executions in advance, undergo description. In the example shown in FIG. 3, they are "1621" and "6834".

A service description portion 407 is an ID list on items that had better undergo operations afterward. After this service is executed, a list of ID that had better undergo execution is shown. In the example shown in FIG. 3, since no description is present, it is "none". The service description portion 407 can undergo description of a plurality of IDs. In addition, in the service description portions 405, 406 and 407, no ID may be present or a plurality of ID may be present in description.

The service description portion 408 is a list of recommended cooperative operations. It is for presenting, to a user in advance as a reference, advice how processing should be implemented in case of bringing a plurality of processing into cooperation, and order of processing and service names, for example, are present in description.

In the example shown in FIG. 3, cooperation operations in which the ID "9621" (own service) is executed after a service based on the ID "338" is executed are named "mail transmission of compressed data".

Here, in the present embodiment, in the service description portion 408, cooperated processing may be described in plurality. In addition, in FIG. 3, as for ID, the ID "338" described in the service description portion 408 is present in description in the service description portion 405 as the same ID as well, but the service description portion 408 does not necessarily have to include those described in the service description portions 405, 406 and 407.

In addition, on the occasion of preparing this service list, an image processing apparatus of providing functions will never notice service information of another image processing apparatus to prepare. That is, the party who has received the service list implements processing.

Here, in the present embodiment, the service list is retained in each respective image processing apparatus and service, and may be updatable. In addition, without allowing each image processing apparatus or each service to retain the service list but a server etc. may manage the service list in order to keep coordinated nature in a concentrated fashion.

Like this, the image processing apparatus 304 having been shown in FIG. 2 undergoes processing on the service list from respective image processing apparatuses 302 and 303 as follows. That is, the image processing apparatus 304 collectively displays onto the output portion 106 the service list having been received from the respective image processing apparatuses 302 and 303 having been responded onto broadcast message, for example, as an UI screen shown in FIG. 4 with control of the CPU 102. Here, as the display device of the output portion 106, a touch screen and a computer display connected to the device are suitable.

Figure 4:
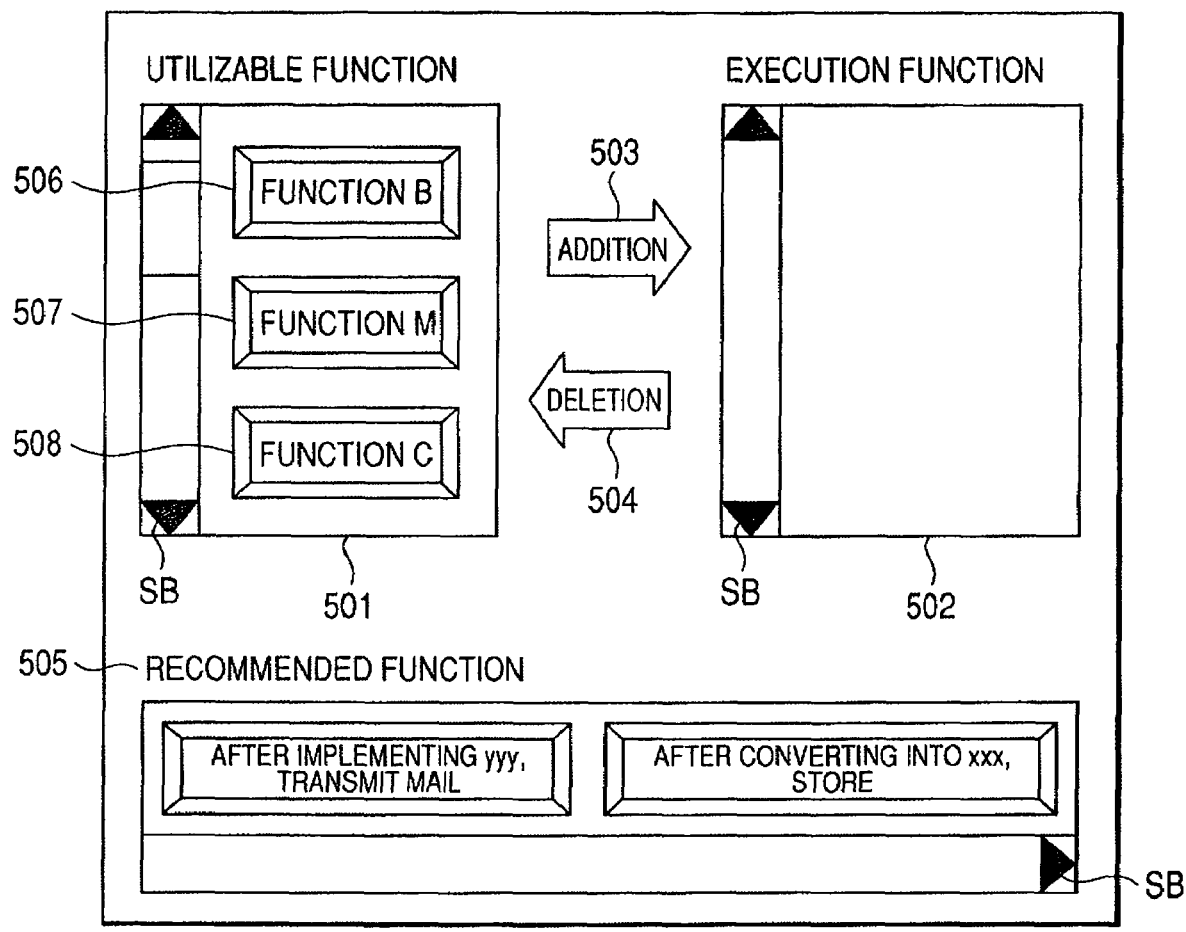
FIG. 4 is a drawing exemplifying a service list display screen displayed in the output portion shown in FIG. 1.

FIG. 4 is a drawing exemplifying service list display screen displayed onto the output portion 106, and is brought into UI display onto the output portion 106 with controls of the CPU 102. Here, the present display example is an example displayed in the output portion 106 including an operation panel of a touch screen system installed in the image processing apparatus 304.

In addition, it is configured so that a user is allowed to give instructions to the image processing apparatus 304 by pushing the touch panel himself/herself in the positions, on the drawing, corresponding to buttons.

In FIG. 4, reference numeral 501 denotes a listing screen on services (functions) utilizable in the present image processing apparatus, and the listing screen 501 is provided with a scroll bar SB and the scroll bar SB is clicked so that functions being present in a hidden region in the screen display state will appear.

Buttons 506, 507 and 508 are displayed at the moment on the listing screen 501 and are realized as buttons of instructing a function B, a function M and a function C respectively.

A user selects a desired function by way of pushing down the buttons 506 to 508 for instruction, an addition button 503, for example, is pushed and thereby the selected function is moved to an execution function 502.

Here, selection on function, which is not shown in the drawing, will not affect the essence of invention if a selected function is reversed in display, is marked so as to make its selection remarkable or is colored differently and the list as far as the user can discriminate it. In addition, reselection may be employed so as to control cancellation of the selection.

When the buttons 506 to 508 are selected on the list screen 501 shown in FIG. 4 and the addition button 503 is pointed, each selected function moves to the execution function 502 as a button, and then in its relation, concentration as well as rearrangement of functions is executed by the CPU 102 so that the user can make selection without difficulty.

In addition, also in the case of initial state where no selection has been implemented, likewise rearrangement is implemented and thereby display is implemented to ease the user to select functions that must be brought into action. A method of realizing this will be described with a flow chart shown in FIG. 5.

FIG. 5 is a flow chart exemplifying a first data processing procedure of the image processing apparatus in the embodiment hereof. It corresponds, for example, with procedure for the image processing apparatus 304 having been shown in FIG. 2 to rearrange all the services (functions) provided by the respective image processing apparatuses 302 and 303 in such an order to ease selection. Here, reference characters with numeral S701 to S723 denote respective steps. In addition, the respective Steps are realized by the CPU 102 shown in FIG. 1 that loads the control program from the hard disk 109 and the ROM 104 etc. to the RAM 103 for execution.

At first, in Step S701, a list Ln provided from all the services Sn provided in the service list sent from respective image processing apparatuses 302 and 303 is obtained.

In particular, for example, suppose the function list shown in FIG. 3 is present in description in an XML format as shown in FIG. 6. Contents are likewise those having been described in FIG. 3.

FIG. 6 is a drawing of describing a data structure of a list of functions shown in FIG. 3 and exemplifies description in the XML format.

In FIG. 6, on each service, a list is generated from a device inherent information portion 801 such as device IDs and IP addresses and the like as well as respective service portions 802.

Like this, with the XML format, there is a method of generating a list on respective services by utilizing XSLT (extensible Stylesheet Language Transformations) and the like.

Here, the respective services are provided with numbers and the service corresponding to a number n is defined as Sn. Moreover, a list corresponding to the service Sn is defined as Ln. A process of obtaining this list Ln is implemented in Step S701.

For example, an example of a list of service generated from the device inherent information portion 801 and the service portion 802 is shown in FIG. 7.

Figure 8:
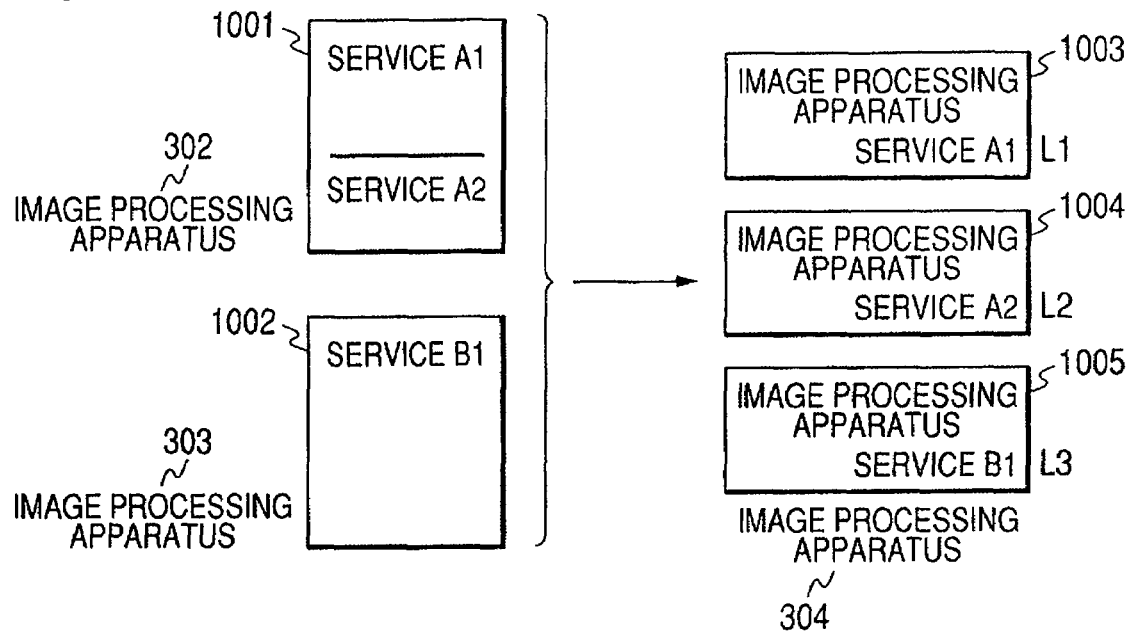
FIG. 8 is a drawing of describing a service list generated from functions of the image processing apparatus shown in FIG. 2.

FIG. 7 is a drawing exemplifying a list of services generated from a device inherent information portion 801 and a service portion 802. FIG. 8 is a drawing of describing a service list generated from functions of the image processing apparatuses 302 and 303 shown in FIG. 2.

As shown in FIG. 7, at the point of time of conversion into a list, only one service is present in description, and as for the tag indicating Service, unique numbers allocated to services are present in description (no attribute and being "1" in FIG. 7).

For example, in case of an example of a system having been shown in FIG. 2, there is a service list 1001 (see FIG. 8) where the services A1 and A2 that the image processing apparatus 302 is providing are present in description and there is a service list 1002 (see FIG. 8) where the service B1 that the image processing apparatus 303 is providing is present in description.

In this case, a list is prepared on a service basis with processing of Step S701.

That is, a list 1003 (list L1) is prepared for the service A1, a list 1004 (list L2) is prepared for the service 305 and a list 1005 (list L3) is prepared for the service 307. In addition, the service A1, the service A2 and the service B1 will respectively become the service S1, the service S2 and the service S3 for the image processing apparatus 304.

Next, in Step S702, cases where any service that is not being provided are deleted from all the lists Ln obtained in Step S701.

For example, in the list example having been shown in FIG. 7, if the service ID6834 is not provided, deletion of this item is implemented.

Next, Step S703 to S717 constitutes a loop processing implemented onto all services that are not determined as those a utilizer is to execute.

At first, in Step S703, a single service Si that has not been selected yet is chosen out from services that have not been determined as items that a utilizer executes and processing through Step S704 to Step S716 in between is executed.

And, in Step S704, the CPU 102 of the image processing apparatus 304 sets parameters C1$i$, C2$i$, C3$i$ and V $i$ retained on the RAM 103 to "0" respectively.

Next, Step S705 to S710 constitutes a loop of making selection on all services other than those selected in Step S703.

Here, all the services including services utilization of which the utilizer has decided are subjects. In this loop processing, a prioritized selection value (Vi) for the service Si is given.

Here, in the present embodiment, as the prioritized selection value is larger, selection had better be made earlier, and those with the prioritized selection value being negative will become those excluded from the selection subjects.

And, in Step S705, for the service Si selected in Step S703, different service Sj is selected. That is, a service Sj with i≠j is selected.

Next, Step S706 determines whether or not the service Sj selected in Step S705 is selected as a function as an execution function. In case of determination of selection as an execution function, the step goes forward to Step S707, and in case of determination of no selection, the step goes forward to Step S711.

Here, the items (1), (2) and (3) described in the flow chart shown in FIG. 5 respectively correspond to "list of IDs of services that must be brought into action in advance", "list of IDs of items that had better be brought into action in advance" and "list of IDs of items that had better be brought into action afterward" in the service list.

And, Step S707 determines the ID of the service Si is included in the item (1) "a list of IDs of services that must be brought into action in advance" of the list Lj, and in case of determination of no presence, the step goes forward to Step S708 and in case of determination of presence, the step goes forward to Step S716.

That is, since the service Sj is already selected by a user, the service Si cannot be executed if the service Si is present in description as an action that must be executed beforehand, and therefore, setting the prioritized selection value (Vi) to "−1" in Step S716, the loop processing of the subsequent Steps S705 to S710 does not have to be implemented and thus dropped out and the step goes forward to Step S717.

On the other hand, in the case where Step S707 has determined that the ID of the service Si is not present in the item (1) "list of IDs of services that must be brought into action in advance" of the list Lj, Step S708 determines inclusion of the ID of the service Si is present in the item (3) "list of IDs of items that had better be brought into action afterward", and in the case of determination of presence, the step goes forward to Step S709 while in the case of determination of no presence, the step goes forward to Step S720.

Here, the service Sj is selected by a user, and the service Si is present in description as the action that had better be executed afterward, and therefore, since the service Si had better select selection, Step S709 adds "1" to the parameter C3$i$.

Next, Step S720 determines the ID of the service Sj is included in the item (1) "a list of IDs of services that must be brought into action in advance" of the list Li, and in case of determination of presence, the step goes forward to Step S721 and in case of determination of no presence, the step goes forward to Step S722.

Here, the service Sj is selected by a user, and therefore, if the service Sj is present in description as the action that had better be executed beforehand, the service Si had better be selected, Step S721 adds "1" to the parameter C1$i$. And Step S722 likewise determines whether or not the ID of the service Sj is included in the item (2) "a list of IDs of items that must be brought into action in advance" of the list Li, and in case of determination of presence, the step goes forward to Step S723 and in case of determination of no presence, the step goes forward to Step S710.

Here, the service Sj is selected by a user, and therefore, if the service Si is present in description as the action that had better be brought into action beforehand, the service Si had better be selected for the future case where the service Sj is selected, and therefore Step S714 adds "1" to the parameter C2$i$.

On the other hand, in the case where Step S706 has been determined that the service Sj selected in Step S705 is not yet selected as an execution function, the step goes forward to Step S711.

And, Step S711 determines the ID of the service Si is included in the item (1) "a list of IDs of services that must be brought into action in advance" of the list Lj, and in case of determination of presence, the step goes forward to Step S712 and in case of determination of no presence, the step goes forward to Step S713.

Here, the service Sj is selected by a user, and therefore, if the service Si is present in description as the action that must be executed beforehand, the service Si needed to be selected in advance for the future case where the service Sj is selected, and therefore Step S712 adds "1" to the parameter C1$i$.

And, Step S713 likewise determines whether or not the ID of the service Si is included in the item (2) "a list of IDs of items that had better be brought into action in advance" of the list Lj, and in case of determination of presence, the step goes forward to Step S714 and in case of determination of no presence, the step goes forward to Step S710.

Here, the service Sj is not selected by a user, and therefore, if the service Si is present in description as the action that had better be brought into action beforehand, the service Si had better be selected beforehand for the future case where the service Sj is selected, and therefore Step S714 adds "1" to the parameter C2$i$.

And, Step S710 determines whether or not the service Sj different from the service Si selected in Step S703 is present, that is, whether or not the service Sj with i≠j is present, and in case of determination of presence, the step returns to Step S705 and in case of determination of no presence, the step goes forward to Step S715 since all the services with i≠j have undergone processing.

And, in Step S715, in order to obtain the prioritized selection value (Vi), the parameters C1$i$, C2$i$ and C3$i$ are multiplied by weights W1, W2 and W3 respectively and are brought into addition.

Here, weight is a coefficient of expressing which to put importance on items (1), (2) and (3) in the list. This value can be changed and the item (1) that must be executed in advance is regarded more important than the items (2) and (3) are, and therefore W1≧W2, W3>0 will be derived. Here, this inequality does not necessarily have to be fulfilled.

Next, Step S717 determines whether or not all the services Si in the services that are not decided as the items that a utilizer is to execute in Step S703, and in the case where no selection has taken place, the step returns to Step S703 and if all have undergone processing, the step goes forward to Step S718.

And, since the prioritized selection values (Vi) have been determined on all the services, Step S718 rearrange positive ones in descending order except the negative ones set in Step S716.

Here, the prioritized selection value (Vi) should undergo selection earlier as it is larger, and therefore will be rearranged in such an order that a user should select. In addition, at this time in the case where the same service is present, it is deleted.

And, in Step S719, the CPU 102 implements display to the output portion 106 having been shown in FIG. 1 in order to notify the user of the services rearranged in Step S718 and the present processing comes to an end.

Here, the case where the same service is present is removed in the stage of final rearrangement processing in Step S718 in the flow chart having been shown in FIG. 5, but otherwise the same service will be deleted at the time of acquisition of the list in Step S701 and the like so that removal is not limited to Step S718.

In addition, in Step S719, the same items may be arranged to be displayed to a user as they are or may be displayed subject to addition of information such as device name and the like. Which same services should be deleted may be decided with any algorithm.

Moreover, in the flow chart having been shown in FIG. 5, the case where all the items (1), (2) and (3) are present in description in the service list is described, but the service list where only one of the items (1), (2) and (3) is present in description will do or the service list where any two of them are present in description will do.

In that case, nothing takes place but the applicable step is skipped.

For example, it is such processing that skips Steps S707, S716, S711, S712, S720 and S721 unless the item (1) is present in description in the list Lj, skips Steps S722, S723, S713 and S714 unless the item (2) is present in description in the list Lj and skips Steps S708 and S709 unless the item (3) is present in description in the list Lj.

Figure 9:
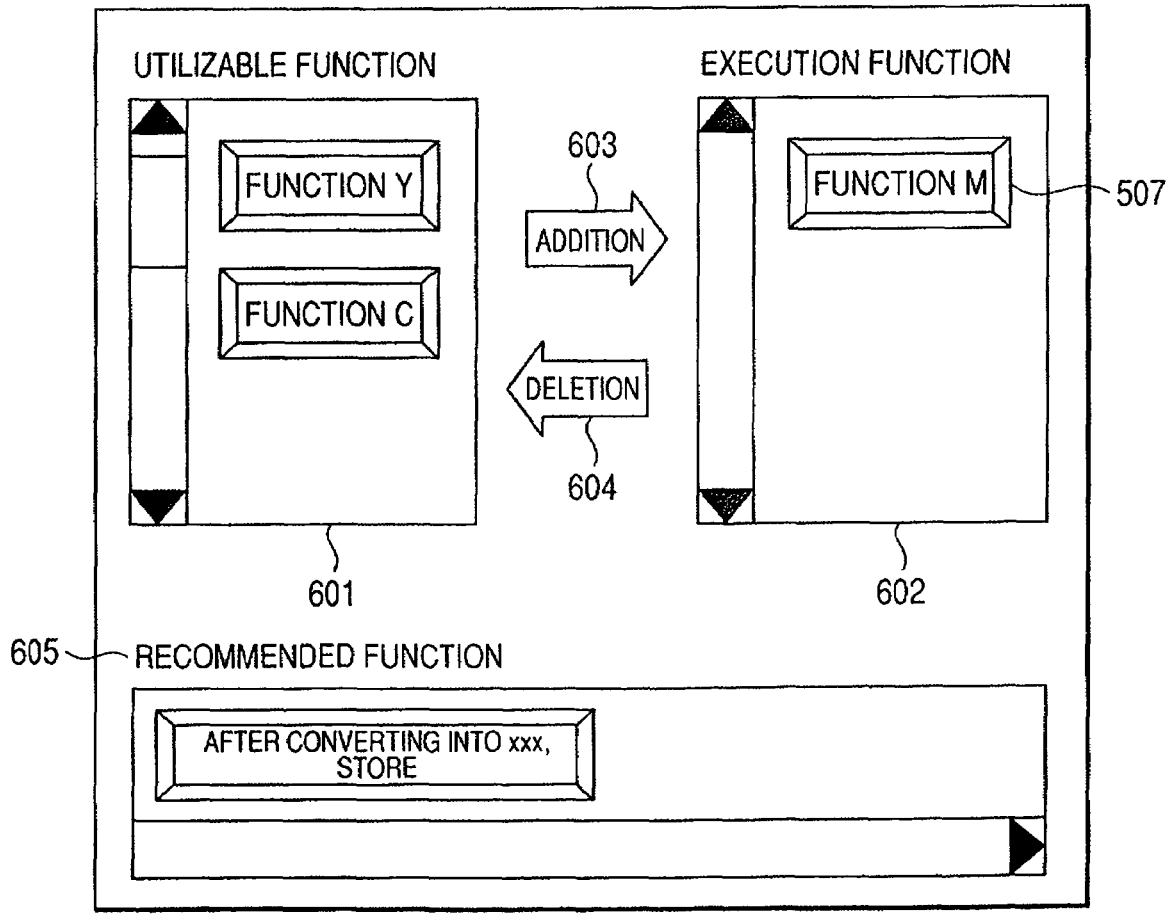
FIG. 9 is a drawing exemplifying a service list display screen displayed in the output portion shown in FIG. 4.

FIG. 9 is a drawing exemplifying a service list display screen displayed in the output portion 106 shown in FIG. 4, and an example of an operation panel where the button 507 corresponding with the function M in FIG. 4 has been selected and moved to the execution function.

In FIG. 9, the function M is displayed in the execution function 602 and at the same time the utilizable function 601 is concentrated in accordance with selection of the function M and the rearranged functions Y and C are displayed in this order.

Reference numeral 603 denotes an addition button, and is pointed in case of adding functions to be selected from utilizable functions 601. Reference numeral 604 denotes a deletion button, and is pointed in case of deleting functions to be displayed onto the execution function 602.

Here, the addition button 604 is utilized in case of executing no function having been selected in the execution function 602. Also in the case where this is utilized, concentration as well as rearrangement of the utilizable functions 601 is implemented again.

In addition, at this time, in the case where functions that must be brought into action in advance is tried to be deleted in functions brought into cooperation, a caution is displayed onto the display portion 106 based on control of the CPU 102. And caution may be followed by execution of control with the CPU 102 so that those where no item that must be executed precedingly is present is displayed in different color or by execution of control with the CPU 102 to implement thin display etc. and thereby to make presentation to the user which function is problematic.

In addition, the execution functions 502 and 602 are to undergo execution first from the function disposed and displayed at the top.

In addition, the order may be made changeable on the execution functions. Also in this case, likewise in the foregoing description, when there is a function to be executed prior to the function that must be executed precedingly, it may be arranged that the CPU 102 executes control to notify the user in message, by changing the color of the function or implement thin display and the like.

Here, a particular example will be described with reference to FIG. 10.

FIG. 10 is a drawing exemplifying services utilizable with the image processing system shown in FIG. 1, and for example four services (service name: PDF conversion, mail transmission, electronic signature and OCR) are supposed to be provided.

As having been described in Step S701 as having been shown in FIG. 5, division is implemented on a service unit basis, and they shall be services S1, S2, S3 and S4 respectively, and their respective lists shall be lists L1 (1401), L2 (1402), L3 (1403) and L4 (1404).

Description in FIG. 10 is subject to extraction of names and "(1) service that must be brought into action in advance", "(2) service that had better be brought into action in advance" and "(3) service that had better be brought into action afterward".

For example, in case of the list L1, the name is "PDF conversion". Here, PDF refers to a document format being widely used for document exchange of Adobe Systems Incorporated. The item (1) that must be brought into action in advance and the item (2) that had better be brought into action in advance are both not present and for the item (3) that had better be brought into action afterward, "mail transmission" and "coding" are present in description.

In addition, in case of the list L2, the name is "mail transmission". In case of the list L3, the name is "electronic signature". In case of the list L4, the name is "OCR". Here, the items (1), (2) and (3) in the drawing are as described above.

FIG. 11 is a drawing exemplifying services utilizable with the image processing system shown in FIG. 1, for example, with four services (service name: PDF conversion, mail transmission, electronic signature and OCR) are provided and moreover is an example of a service list subject to execution of the above described Step S702.

The point different from FIG. 10 is that, in short, it is an consequence subject to removal of the services not provided in FIG. 10, and since "coding" as well as "translation" service is not provided in this environment, the above described two services that are unnecessary and not provided are removed from the list 1501 and the list 1504.

The list 1502 and the list 1503 shown in FIG. 11 are the same as the list 1402 and the list 1403 since there was no unnecessary service.

Now, description on initial display in the case where nothing is selected as the service (function) that a utilizer utilizes will be made to proceed based on the steps shown in FIG. 5.

Step S703 to Step S717 implements processing to derive prioritized selection values (Vi) on all the services.

For example, in the case where Step S703 selects the service S1, Step S705 implements processing on all the services with the exception of the service S1. When Step S705 is selected in the service S1, Step S711 confirms whether or not the service S1 is included in the item (1) of the list L2, and since it is not included, the step goes forward to Step S713.

In addition, Step S711 confirms whether or not the service S1 is included in the item (2) of the list L2, and since it is included, "1" is added to the parameter $C2i$. That is, since the initial value of the parameter $C2i$ was "0", "1" will be derived.

Likewise, Step S705 selects the services S3 and S4 to implement processing, finally deriving $C1i=1$, $C2i=1$ and $C3i=0$, and therefore the prioritized selection value (Vi) of the service S1 calculated in Step S715 will become W1+W2.

In addition, for the services S2, S3 and S4 selected in Step S705, the prioritized selection values (Vi) are derived likewise to become V2=0, V3=0 and V4=0. And due to W1≧W2 and W3>0, the service S1 (PDF conversion) had better be selected precedingly and Step S718 rearranges the prioritized selection values while Step S719 implements display.

Here, in case of this example, the services S2, S3 and S4 are provided with the same prioritized selection value (0). The arrangement system of those carrying the same prioritized selection values is optional. A condition may be set so as to be complied or completely optional order may be taken.

Next, in the above described example, the case where a utilizer has selected the service S1 (PDF conversion) will be described.

Since the service S1 is selected by the utilizer, the service to become a subject in Step S703 will be services S2, S3 and S4. The case where the service S2 is selected in Step S703 is considered.

Then, unlike Step S703, Step S705 takes all services as subjects with exception of the service S2, that is, services S1, S3 and S4.

For example, in the case where Step S705 has selected the service S1, since it is already selected, the step goes forward to Step S707 through Step S706.

Determination of Step S707, S708 and S720 and S722 is implemented. In Step S708, since the service S2 is included in the item (3) in the list L1, "1" is added to C32.

In addition, in Step S722, since the service S1 is included in the item (2) in the list L2, "1" is added to C32. In addition, Step S707 and Step S720 do not comply with the condition, no processing is implemented. Also as for the services S3 and S4, the flow chart in FIG. 5 is likewise followed, finally deriving C11=0, C21=1 and C31=1, and therefore the prioritized selection value V2 of the service S2 calculated in Step S715 will become W2+W3.

Next, the case where the service 3 has been selected in Step S703 will be considered.

In this case, unlike Step S703, Step S705 takes all services as subjects with exception of the service S2, that is, services S1, S2 and S4. For example, in the case where Step S705 has selected the service S1, since it is already selected, the step goes forward to Step S707 through Step S706.

And determination of Step S707, S708 and S720 and S722 is implemented. And in Step S708, since the service S3 is included in the item (3) in the list L1, "1" is added to C31.

In Step S720, since the service S1 is included in the item (1) in the list L3, "1" is added to C13. In addition, Step S707 and Step S722 do not comply with the condition, no processing is implemented. Also as for the services S2 and S4, the flow chart in FIG. 5 is likewise followed, finally deriving C11=1, C21=0 and C31=1, and therefore the prioritized selection value V3 of the service S3 calculated in Step S715 will become W1+W2. Likewise deriving the value in the case where the service S4 has been selected in Step S703, the prioritized selection value will become V4=0.

Here, due to W1≧W2, W3>0, if W1 is truly larger than W2 as in W1>W2, W3>0, V3>V2>V4 is derived and therefore, the service S3 (electronic signature), the service S2 (mail transmission) and the service S4 (OCR) will be displayed in this priority.

Actually, such a system to scan a document with an image processing apparatus, implement PDF conversion, put electronic signature thereon and be transmitted by mail can undergo decision making on prioritized display order based on the flow chart having been shown in FIG. 5.

For example, "mail transmission" is displayed prior to "electronic signature" and if a utilizer had mistakenly selected "mail transmission", it will become impossible to send a PDF document with an electronic signature that should be done so originally.

Items displayed in a recommended function 505 in the screen display example shown in FIG. 4 and a recommended function 605 in the screen display example shown in FIG. 9 is recommended actions present in the service list. For any recommended action, every time an execution function is selected, rearrangement and display is implemented. How to implement rearrangement will be described with a flow chart in FIG. 12.

Figure 12:
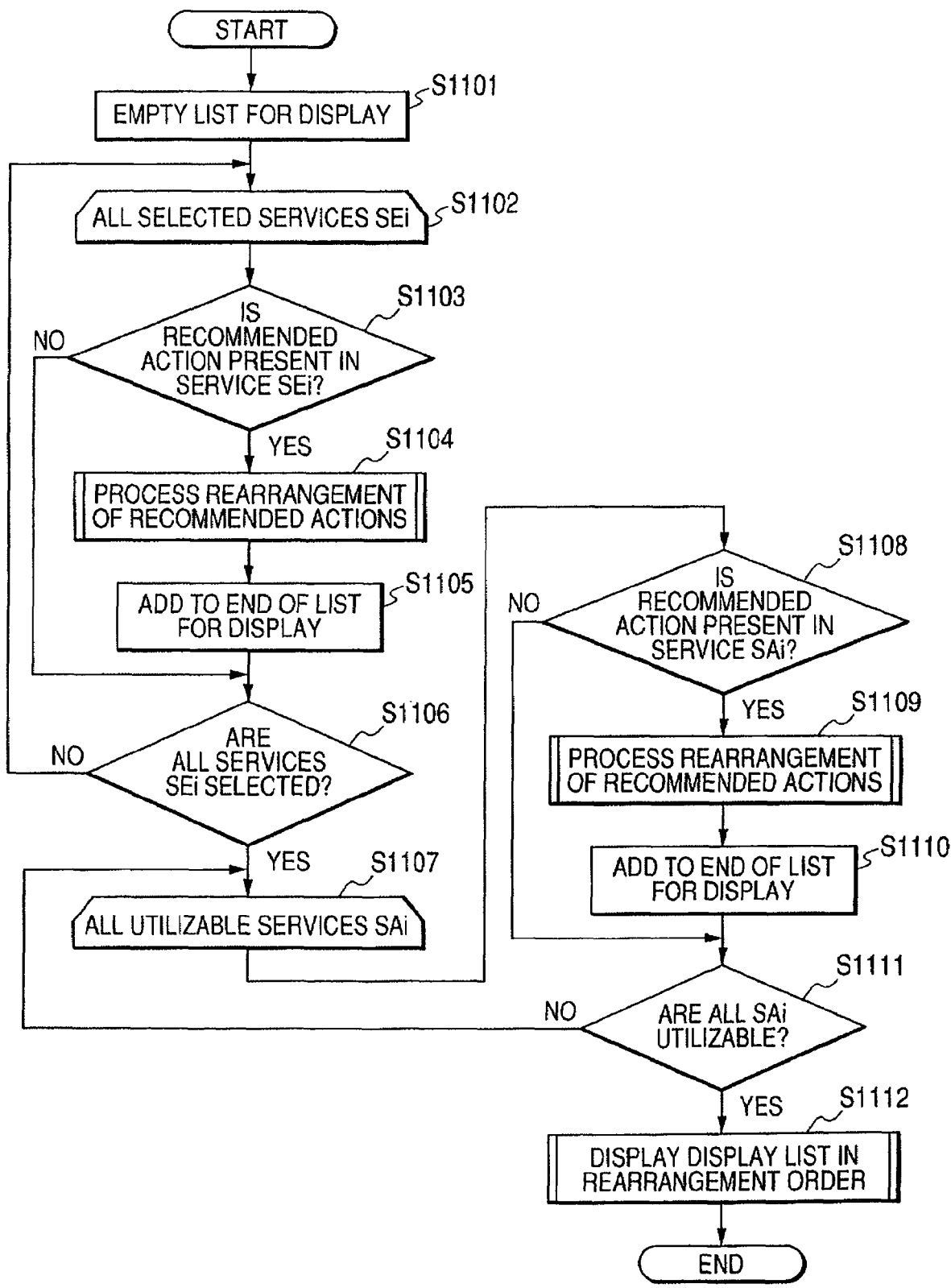
FIG. 12 is a flow chart exemplifying a second data processing procedure in the image processing apparatus of the embodiment hereof.

FIG. 12 is a flow chart exemplifying a second data processing procedure in the image processing apparatus of the embodiment hereof and corresponds with controlling procedure of rearranging and display every time when a function is selected. Here, reference characters with numerals S1101 to S1112 denote respective steps, and the respective Steps are realized by loading to the RAM 103 for execution the control program that the CPU 102 reads out from the hard disk 109.

Step S1101 empties the list with order (secured in the RAM 103) for display onto the output portion 106 of the image processing apparatus. On those kept in storage in this list with order, the CPU 102 displays the top one in priority.

Next, Step S1102 selects all the services to be executed SEi selected. Here, the order of selection in Step S1102 is utilizer's selection order.

And, Step S1103 determines whether or not a recommended action is present in the service SEi selected in Step S1102.

In more particular, it is determined whether or not any description on "recommended action" of the list LEi corresponding with the service SEi is present. And, in the case where presence of a recommended action is determined, the step goes forward to Step S1104 and in case of determination of no presence, the step goes forward to Step S1106.

And, Step S1104 implements rearrangement on all the recommended actions defined in the service SEi. Details of Step S1104 will be described later with FIG. 13.

Next, Step S1105 adds a list derived in Step S1104 to the end of the list with order for display. Next, Step S1106 determines whether or not processing on all the selected services has already been finished, and in case of determination that it has not been finalized yet, the step returns to Step S1103 to repeat processing on the next service while in case of determination that it is finished, the step goes forward to Step S1107.

And, Step S1107 selects all the utilizable services to be executed SAi.

Here, as for the order to be selected in Step S1107, selection will go on in accordance with the order determined in the flow chart having been shown in FIG. 5. That is, those with higher prioritized selection value will be selected first.

Next, Step S1108 determines whether or not a recommended action is present in the service SAi selected in Step S1107.

In more particular, it is determined whether or not any description on "recommended action" of the list LAi corresponding with the service SAi is present, and in the case where presence of a recommended action is determined, the step goes forward to Step S1109 and in case of determination of no presence, the step goes forward to Step S1111.

Next, Step S1109 implements rearrangement on all the recommended actions defined in the service SAi. Here, since the present step undergoes processing likewise in Step S1104, details of Step 1109 will be described later with FIG. 13 as well.

Next, Step S1110 adds a list derived in Step S1109 to the end of the list with order for display. And Step S1111 determines whether or not processing on all the utilizable services has already been finished, and in case of determination that it has not been finalized yet, the step returns to Step S1107 to repeat processing on the next service while in case of determination that it is finished, the step goes forward to Step S1112.

And, display is implemented in order to notify the user of the recommended services rearranged based on the finally derived list with order in Step S1112 and the present processing comes to an end.

In addition, at this time, in the case where the same recommended action is present, only one may be deleted or they may be arranged in plurality subject to an appropriate judgment. In addition, as judgment, for example, feasibility of processing only with a device being present in the vicinity, charge in the case where a service is charged or processing speed etc. may be employed.

Figure 13:
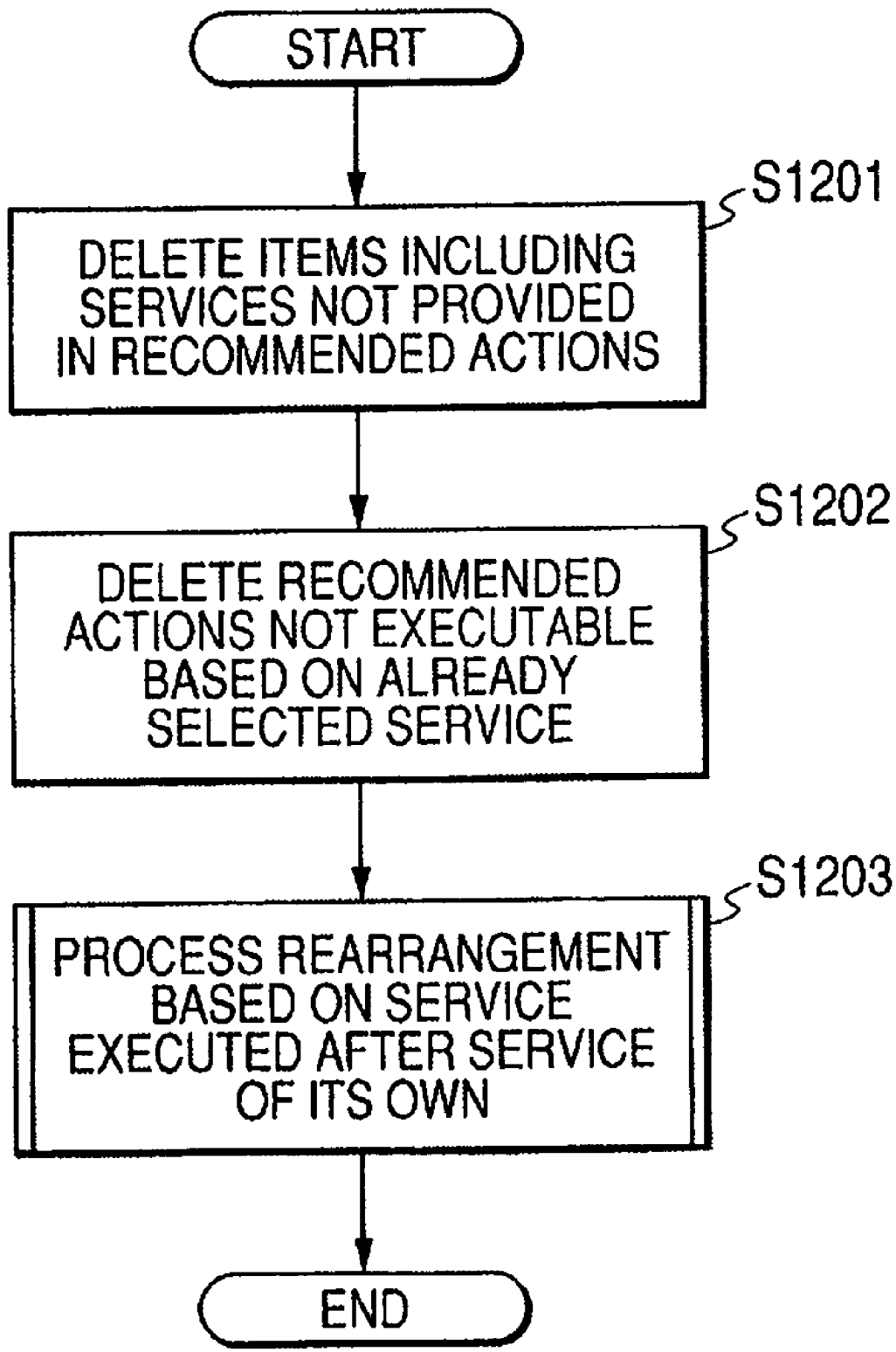
FIG. 13 is a flow chart exemplifying a third data processing procedure of the image processing apparatus showing the embodiment hereof.

FIG. 13 is a flow chart exemplifying a third data processing procedure of the image processing apparatus showing the embodiment hereof and corresponds with the detailed procedure (processing procedure of rearranging recommended actions on one service while deleting unnecessary items) on the rearrangement processing of Steps S1104 and S1109 having been shown in FIG. 12. Here, reference characters with numerals S1201 to S1203 denote respective steps, and the respective Steps are realized by loading to the RAM 103 for execution the control program that the CPU 102 reads out from the hard disk 109.

The present processing takes as processing subject at least one recommended action described in the list corresponding with the service. For example, when a list for a service ID9642 described in the XML format as shown in FIG. 14 is present, the recommended action is caused to be described in a frame 1301.

FIG. 14 is a drawing exemplifying a list of services in the image processing apparatus in the embodiment hereof.

In the example shown in FIG. 14, three recommended actions set by actions 1302, 1303 and 1304 are present. Here, the other portions are not essential for description, and therefore are omitted.

At first, Step S1201 deletes items where no service is provided in the recommended actions. That is, the recommended actions including those where service IDs are not present in the service lists of the above described respective image processing apparatuses.

For example, in FIG. 14, in the case of environment where no service of the service ID10004 is provided, the recommended action with the recommended action name being "yyy" is deleted and only the recommended action names "xxx" and "zzz" will become the subjects for processing.

Next, Step S1202 deletes the recommended actions that do not match the order of the already selected services. For example, the recommended actions have service IDs "1000, 2000, 3000, 4000, 5000, 6000" in this order and the service ID of its own is supposed to be 3000, which is not shown in the drawing though.

At this time, for example, in the case where the service is selected in order of "2000, 1000", they are deleted. That is, the services being present in description prior to the service ID of its own are deleted unless they have already been selected in this order.

In addition, for example, also in the case where the service with the service ID "6000" has already been selected, this recommended action is deleted. That is, the services being present in description after the service ID of its own are deleted if they are selected.

And Step S1203 implements rearrangement based on the services being present in description with the service ID of its own and onward, and the present processing comes to an end.

As for rearrangement in this case, rearrangement may be implemented with, for example, the one that finishes processing earlier based on processing performance of each service. In addition, such a system that arranges them from the lowest charge in accordance with charging information.

Moreover, arrangement may be implemented based on physical position information corresponding with position information on the network so as to start with such service that completes processing in the vicinity. These may be brought into combination. Here, such service information may be included in the service list to be delivered, or such a mechanism to implement data exchange separately may be employed.

As described in the present embodiment, since exchange of data between respective services may be implemented in XML, SOAP (Simple Object Access Protocol) being a known technology, for example, may be arranged to be used. Exchange between an image processing apparatus and a service may be implemented by using a service list in the Body portion of SOAP or service control etc. that is not shown in the present embodiment may be arranged to be implemented with SOAP.

Employing such an arrangement, exchange of data will become feasible not only on devices or services connected to LAN (Local Area Network) but also in the case where a proxy server is present.

In this case, since it is impossible to implement search for utilizable services with broadcast message since involvement of the Internet, it is advisable to employ such a mechanism to request for a service list to a preset target device or a service.

In addition, search for services may be arranged within a range of a certain fixed network (within a range of IP addresses). In this case, in the case where the processing subject data cannot be exchanged as binary data level on the Internet, it is advisable that such a mechanism of exchanging data likewise with SOAP subject to encoding with Base 64 etc. is provided for execution.

Naturally, due to the data leak on the Internet, the data of SOAP undergo coding or electronic signature so as to enhance the level of security. That is, the present embodiment will not be limited to a local network but applicable to a global network (the Internet) as well.

Here, in the present embodiment, an image processing apparatus is described as a device, but in case of an apparatus having a function of providing service, an apparatus having a function of receiving a service, an apparatus having a function of displaying a service being to be provided or an apparatus having a function of designating execution order of services, application of the present invention will not be limited to a photocopier, for example, as an image processing apparatus.

Second Embodiment

In a second embodiment, such a mechanism to describe, onto a service list, prohibited services that are nonexecutable in case of having been executed beforehand may be provided so as to concentrate functions (services) to be presented to a utilizer. The present embodiment is likewise the first embodiment, and therefore description on likewise portions will be omitted.

FIG. 15 is a drawing exemplifying a service list undergoing processing with the image processing apparatus showing the second embodiment of the present invention, and is an example of having expressed, in XML format, a service list to which prohibited services, for example, have been added.

Figure 16:
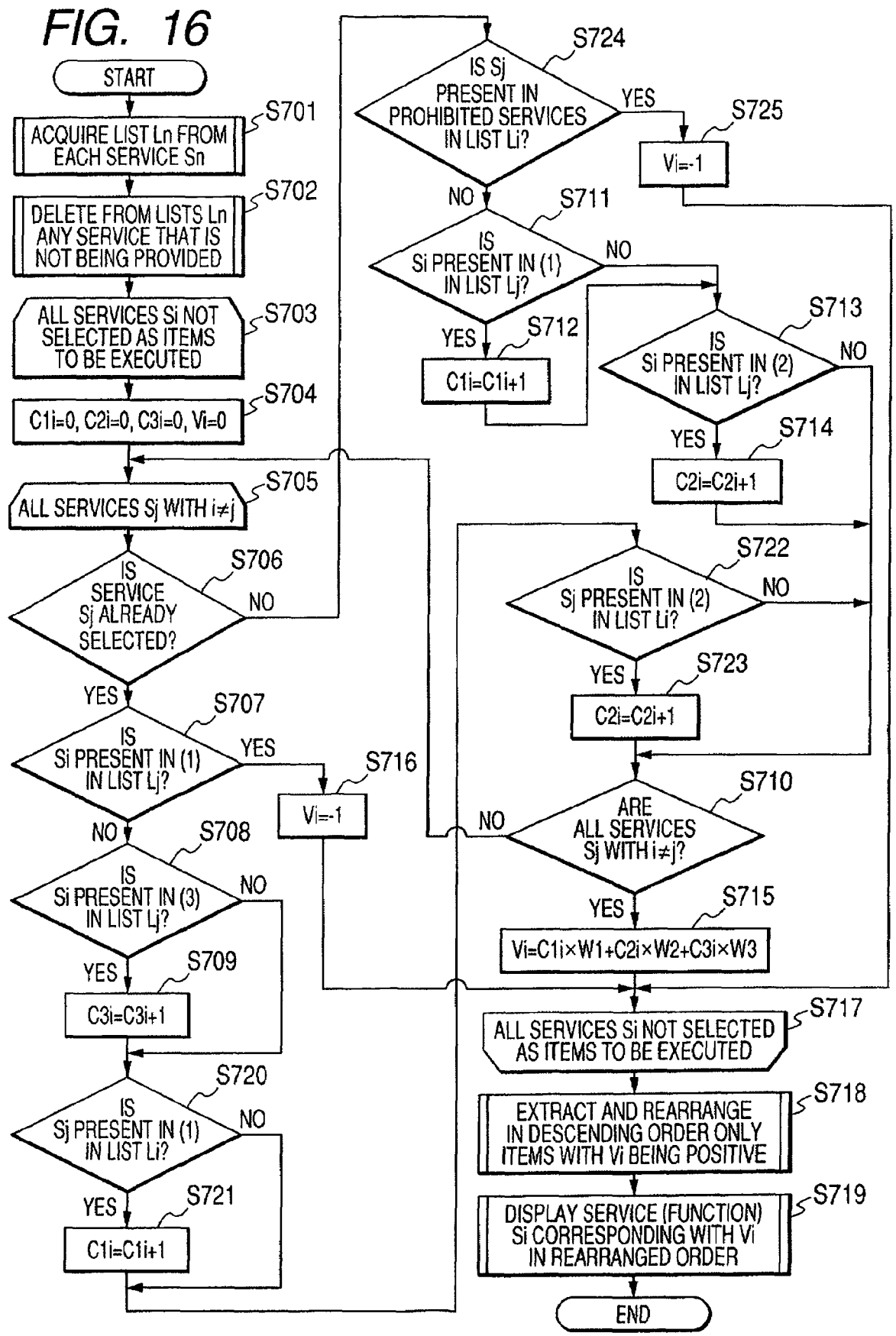
FIG. 16 is a flow chart exemplifying a fourth data processing procedure in the image processing apparatus showing the embodiment hereof.

In FIG. 15, the portion described by Prohibit tag 1601 is a list of IDs that cannot be brought into action if they are being executed beforehand, and this example expresses that a service ID 9642 cannot be executed in the case where services with IDs "442" or "6975" are executed beforehand, FIG. 16 is a flow chart of exemplifying a fourth data processing procedure in the image processing apparatus showing the present embodiment and corresponding with processing procedure of removing prohibited actions from all the services (functions) provided by respective image processing apparatus to rearrange in a simply selectable order. Here, reference numeral with characters S701 to S723 denote respective steps, and the respective steps are realized by a CPU 102 reading a control program from a hard disk 109 etc. to load onto a RAM 103 to execute.

Here, in the steps shown in FIG. 16, the same steps as those in FIG. 5 are provided with the same step numerals and descriptions thereof will be omitted. In the present embodiment, Steps S724 and S725, which are added, will be described.

At first, Steps S701 to S705 undergo like in the first embodiment, and thereafter in the case where a service Sj is determined to be already selected by a utilizer in Step S706, conditions determination in Step 724 added in the present embodiment is implemented.

And, in Step S724, presence of Sj in a list Li in a service Si is determined, and in the case where the presence is determined, the step goes forward to Step S725, the prioritized selection value is set to "−1" in Step S725, and then the loop processing from subsequent Step S708 to Step S710 does not have to be implemented, and therefore drops out so that the step goes forward to Step S717.

That is, in the state where the service Sj has been decided for execution and since the service Si has prohibited execution of the service Sj in advance, there is no need to display the service Si, and therefore the prioritized selection value is set to a negative value to finalize the present processing so that the step goes forward to Step S717.

On the other hand, in the case where no presence is determined in Step S724, the step goes forward to Step S711. In Step S711 and onward, the same processing as in FIG. 7 is implemented.

In addition, the present embodiment may be devised so as to give restrain by document format that each service handles. In particular, utilizable format is compared with document format after execution of service during the course of execution of service so as to remove not utilizable service from display to determine a display order to realize.

FIG. 17 is a drawing exemplifying a service list in the image processing apparatus showing the embodiment hereof, and an example where formats that can be dealt with and formats converted to consequence subject to application of services.

In FIG. 17, reference numeral 1801 denotes an Available tag, where a format utilizable in this service is present in description. This embodiment indicates that the type attribute of the Format tag can cover "image" as formats, and moreover specifies types of detailed format such as JPEG and PNG etc. by Sub Format tags. Here, in the present embodiment, further detailed format conditions may be added.

Reference numeral 1802 denotes a Format tag, where a format to under conversion after finalization of this service is present in description, and in the present embodiment, the PDF format has been employed.

Since the function that is executed at the last among those selected like this is the final format, that format is compared with formats that can be treated in the service not selected, and unless there is no matching, exclusion from the display subjects is implemented.

For example, although this is not shown in the drawing, in the flow charts shown in FIG. 5 or FIG. 16, between Step S703 and Step S704, the utilizable format of the service Si is compared with the format derivable by services executed at the last among the selected functions, and the service Si cannot be executed unless it is in a utilizable format, and therefore the prioritized selection value is set to "−1" and the step goes forward to Step S717 so as to enable realization.

The present embodiment had only one format subject to conversion, but such a mechanism may be taken that delivers the original format and the format subject to conversion or the format undergoing conversion in a service being executed in middle of the procedure in plurality at the same time so as to increase utilizable formats.

In this case, the above described comparison subject undergoes comparison whether or not it is utilizable not only to "format derivable by service executed at the last among the selected functions" but also to all the formats having been delivered simultaneously as subjects.

Figure 18:
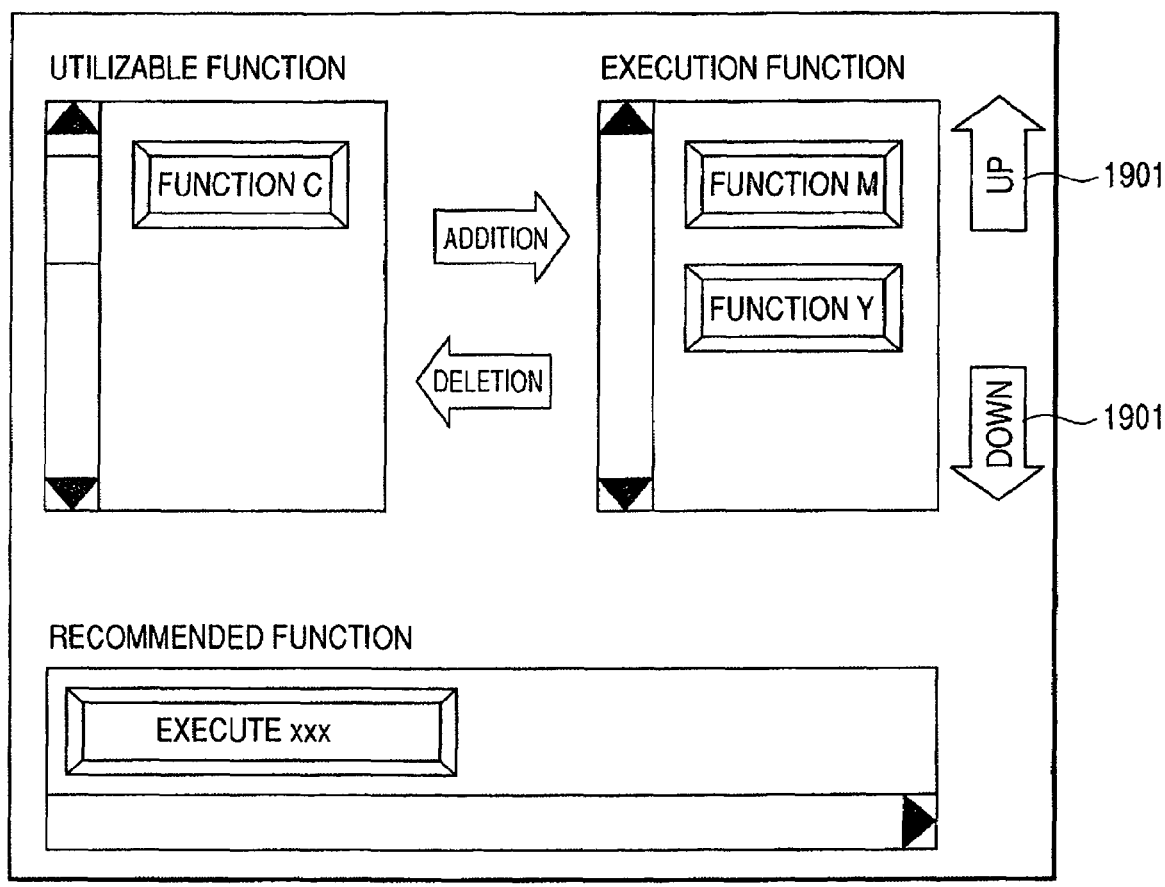
FIG. 18 is a drawing exemplifying a function selection screen displayed in the image processing apparatus showing the embodiment hereof.

Moreover, as shown in FIG. 18, already selected function may be provided with such a mechanism that can change the order.

FIG. 18 is a drawing exemplifying a function selection screen displayed in the image processing apparatus showing the embodiment hereof and is displayed onto the output portion 106 with control of the CPU 102 having been shown in FIG. 1.

In FIG. 18, reference numerals 1901 and 1902 denote buttons of instructing changes in the order of functions, and instruction with the button 1901 moves the order of the service selected by the execution function upward than the present display position with regard to the selected one. In addition, the button 1902 moves oppositely the order of the service selected by the execution function downward with regard to the selected one.

Thus, in accordance with change in display order, the CPU 102 executes a series of processing in FIG. 16 having been described, and thereby unnecessary processing is omitted or such rearrangement of order so as to ease selection is implemented.

Here, in case of rearranging the order, such a service is present that will become nonexecutable depending on rearranged consequence even if it has already been selected, and therefore, in such a case, display of caution or display that no selection is allowed will do.

According to the present embodiment, in accordance with selection that a utilizer arranges to execute, not only rearrangement in order that eases utilization can be realized Other Embodiment The above described embodiment has described the case of making an inquiry to all the devices on a network to acquire a service list that each device stores and controlling UI screen display of implementing function selection in the case where another device utilizes functions of a device on a network, but such a configuration that the range of the utilized device is limited, that is, for example, limited by IP address or device name etc. so as to implement function selection display in utilization of that limited devices may be employed.

The above described embodiment has described the case of making an inquiry to all the devices on a network to acquire a service list that each device stores and controlling UI screen display of implementing function selection in the case where another device utilizes functions of a device on a network, but such a configuration that the screen displayed in the requesting party's device undergoes display control through a driver at the client apparatus side not shown in the drawing may be employed.

In addition, the above described embodiment has described an example that a user of each device can utilize functions of another device in full specifications, but more customized function display control may be realized by limiting the selectable devices on a user basis or on a group basis and thus setting the range of utilizable services individually.

In addition, the case of making an inquiry to all the devices on a network to acquire a service list that each device stores and controlling UI screen display of implementing function selection in the case where another device utilizes functions of a device on a network has been described, but the function selection screen having defined the relationship between the set UI screen and the device may be configured registable on a user basis or on a group basis so as to enable function selection from the registered UI screen in the case where the registered device is utilizable after user authentication.

The above described embodiment has described an example of bringing functions of image processing apparatus as a device, but also in a data processing apparatus to be operated with a predetermined OS as a device or such a data processing system that provides functions providable by, for example, a Web service, the present invention is applicable even to such a system that information for bringing into cooperation the applicable services in each data processing apparatus (in the present embodiment as well the information such as order, limitation, prohibition etc. is likewise added) is stored as a file, and thereby that file is exchanged between data processing apparatuses so that a requesting party executes function selection display appropriate to the service selection menu to a requested party, utilizes functions of the application of any data processing apparatus in Web services, another data processing apparatus receives consequence thereof as an XLM file and another data processing apparatus provides the XML file with another processing to bring functions of the application into cooperation.

With reference to the memory map shown in FIG. 19, the configuration of a data processing program readable with a printing apparatus related to the present invention will be described as follows.

Figure 19:
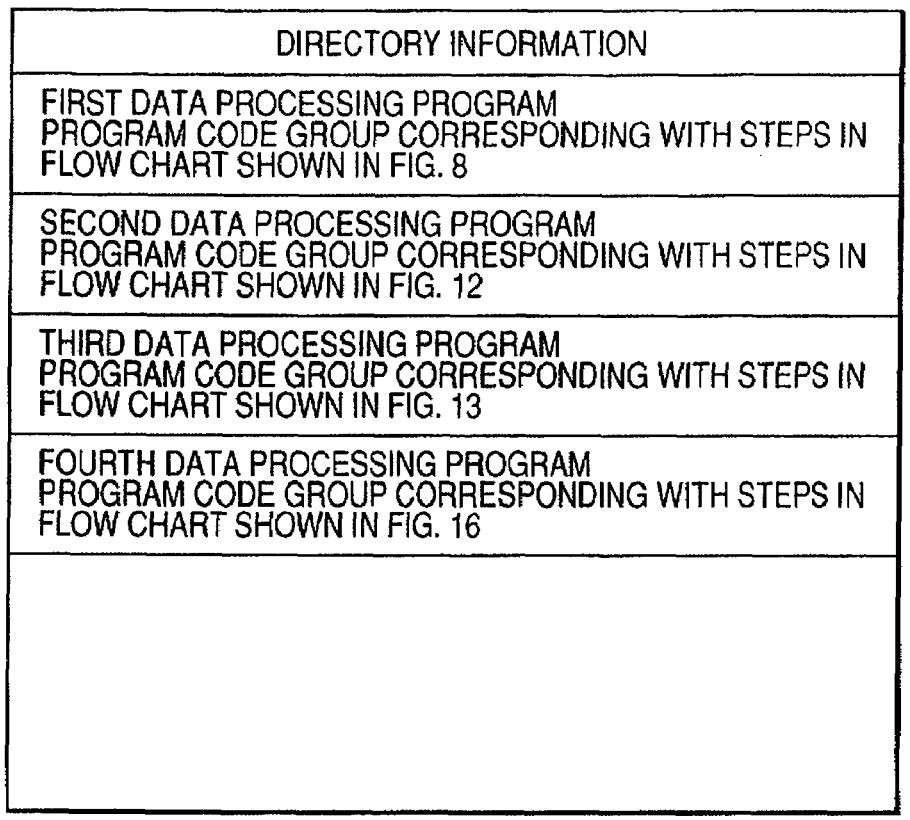
FIG. 19 is a drawing of a memory map of storage media to store respective kinds of data processing programs readable with the image processing apparatus related to the present invention.
Figure 20:
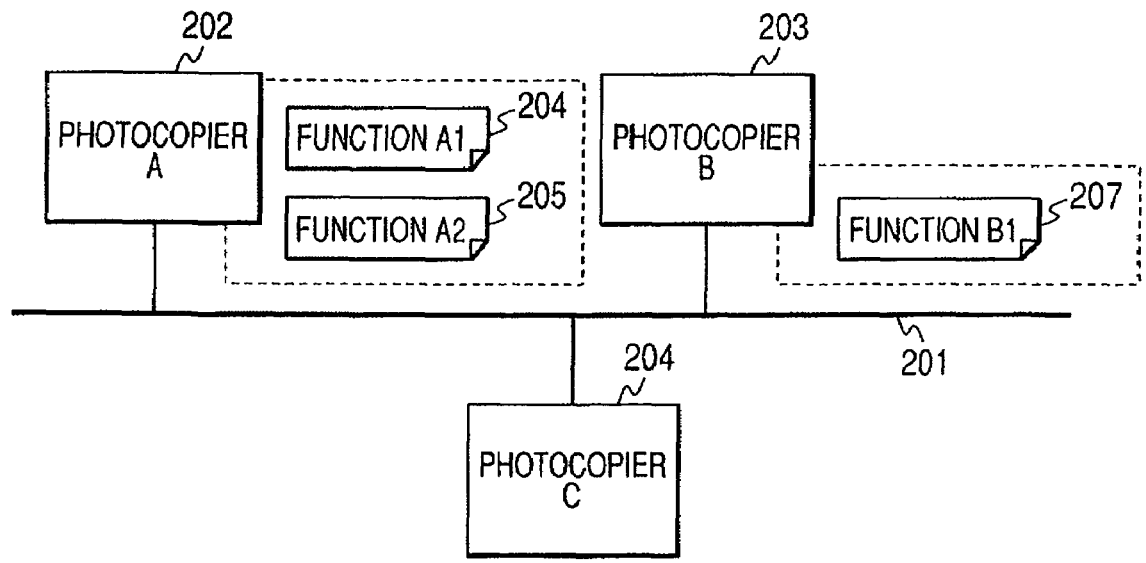
FIG. 20 is a block diagram of describing an example of this type of image processing system.

FIG. 19 is a drawing of a memory map of a storage media to store respective kinds of data processing programs readable with the image processing apparatus related to the present invention.

Here, although not shown in the drawing, information of managing program groups stored in storage media, for example, version information and author etc. is occasionally stored and information depending on the OS etc. at the program read out side, for example, icon etc. of identifying and displaying a program is occasionally stored.

Moreover, data subordinated to respective types of programs are present under management in the above described directory. In addition, in the case where a program for installing the respective types of programs into a computer or an installing program is present in compression, a decompressing program etc. is occasionally stored.

Functions shown in FIG. 5, FIG. 12, FIG. 13 and FIG. 16 in the present embodiment may be implemented by a host computer by programs installed from outside. And, in that case, the present invention will be applied even to such a case that an information group including programs is supplied to an output apparatus with storage media such as a CD-ROM, a flash memory or FD etc. or from outside storage media through a network.

It goes without saying that the object of the present invention is attained by, as the above, supplying a system or an apparatus with storage media where program codes of a software of realizing functions of information embodiment have been stored so that the computer (or CPU and MPU) of that system or apparatus reads and executes the program codes stored in the storage media.

In this case, the program codes themselves read out from the storage media will realize the novel functions of the present invention and the storage media where those program codes are present in storage will configure the present invention.

Accordingly, an object code, a program executed by an interpreter and script data supplied to OS etc. can be used without considering the form of programs if they have function of the program.

As storage media for supplying programs, flexible disk, hard disk, optical disk, magneto-optical disk, MO, CD-ROM, CD-R, CD-RW, magnetic tape, nonvolatile memory card, ROM, DVD and the like, for example, can be used.

In this case, the program codes themselves read from the storage media will realize the functions of the above described embodiment and the storage media where those program codes are present in storage will configure the present invention.

Otherwise, as a method of supplying programs, they can be supplied by using a browser of a client's computer to connect to a web site on the Internet and downloading from the web site into storage media such as a hard disk etc. the computer program itself of the present invention or a compressed file including an automatic installing function. In addition, it is also realizable by dividing the program codes configuring the program of the present invention into a plurality of files and downloading the respective files from different web sites. That is, WWW servers and ftp servers etc. that cause a plurality of users to download the program files for realizing the function processing of the present invention with a computer will be included in claims of the present invention.

In addition, it is also realizable by coding the programs of the present invention to store in storage media such as CD-ROM etc. and delivering them to users; causing users who have cleared predetermined conditions to download key information of decoding the coding from a web site through the Internet and to execute the coded program with use of that key information to implement installation into a computer.

In addition, it goes without saying that not only the case where the above described functions of the above described embodiment are realized with execution of a program code read by a computer but also such a case is included where an OS (operating system) etc. that is in operation on a computer based on instructions of that program code implements a part or the whole of actual processing and that processing realizes the functions of the above described embodiment.

Moreover, it goes without saying that the program code read from storage media is written into a memory provided in an extension board inserted into a computer or an extension unit connected to a computer, and thereafter based on instructions of that program code, a CPU etc. provided in that extension board or that extension unit implements a part or the whole of actual processing and that processing realizes the functions of the above described embodiment.

The present invention will not be limited to the above described embodiments, but a variety of variations (including organic combinations of respective embodiments) are allowed based on intent of the present invention, and they will not be excluded from the scope of the present invention.

Various examples and embodiments of the present invention have been shown and described, and it goes without saying to those skilled in the art that intent as well as scope of the present invention will not be limited to a particular description in the specification hereof but the following implementation mode will be included.

A service processing apparatus capable of communicating with respective apparatuses distributed on a network and utilizing, as service, functions providable at respective apparatuses, having: an obtaining unit adapted to obtain service information including cooperation information on individual services provided from respective apparatuses (Step S701, shown in FIG. 5, of loading, to the RAM 103, control programs that the CPU 102 having been shown in FIG. 1 reads from the hard disk 109 etc. for execution); a determining unit of assessing cooperation information of respective services based on service information of respective apparatuses obtained by the above described obtaining unit and determining priorities of respective services to be displayed onto a display portion (Steps S703 to S717, shown in FIG. 5, of loading, to the RAM 103, control programs that the CPU 102 having been shown in FIG. 1 reads from the hard disk 109 etc. for execution); and a control unit of displaying respective services onto the above described display portion based on priorities determined by the above described determining unit (Steps S718 and S719, shown in FIG. 5, of loading, to the RAM 103, control programs that the CPU 102 having been shown in FIG. 1 reads from the hard disk 109 etc. for execution).

Thereby, in case of utilizing services of each apparatus, the priority of services to be displayed is determined uniquely so that a user will no longer need to be troubled with preparation of contents of services in advance but can select the intended service processing by bringing, into cooperation, at least one service to be provided. In addition, there is no need to be aware of the execution order of services but changes in services can be handled flexibly.

A service processing apparatus wherein the above described control unit changes display contents of services to be displayed next based on the selection state of the services displayed on the above described display portion.

Thereby, service will become selectable while services to be selected next that have undergone optimization on a service selection basis are being confirmed uniquely.

A service processing apparatus wherein the above described cooperation information includes services that must be executed prior to execution of services, services that had better be executed prior to execution of services and services that had better be executed after execution of services.

Thereby, respective apparatuses competes service each other and it is automatically determined what is optimum order processing, and increase in number of cooperating service can be handled without difficulty.

A service processing apparatus that has a requesting unit of requesting, to respective apparatuses, execution of services displayed onto the above described display portion.

Thereby, service processing in free utilization of services that the apparatus the requesting party owns does not provide can be instructed.

A service processing apparatus capable of providing a service of executing predetermined functions on a service request from a processing apparatus of a source of the request, comprising: a storage unit of storing service information on a providable service basis (the hard disk 109, shown in FIG. 1, that, for example, the image processing apparatuses 302 and 303, that are image processing apparatuses on the providing side, having been shown in FIG. 2 comprises); a transmitting unit of transmitting the above described service information being present in storage in the above described storage unit based on service information obtaining request from a processing apparatus of the above described source of the request (the network interface 107 shown in FIG. 1); and an executing unit of executing, based on service request from the above described source of the request, services based on predetermined functions (processing of loading, to the RAM 103, control programs that the CPU 102 having been shown in FIG. 1 reads from the hard disk 109 etc. for execution, that corresponds with a series of processing of making scanned image data into a PDF to undergo mail transmission).

Thereby service processing of having, in common, functions that individual service processing apparatuses comprises and bringing at least one service into cooperation can be implemented.

A service processing apparatus, comprising a changing unit of changing execution order of services displayed on the above described display portion (changing execution order of services being displayed, based on instruction from the input portion 105 shown in FIG. 1), wherein the above described control unit changes the method of displaying the services displayed on the above described display portion in case of having changed execution order of the above described service with the above described changing unit.

Thereby, automatically determined service execution rank can be changed freely to rank intended by a user.

A service processing apparatus, wherein the above described cooperation information includes recommended cooperation action information in combination with a plurality of services; the above described determining unit assesses recommended cooperation action information of respective services based on service information of respective apparatuses obtained by the above described obtaining unit and determines priorities of respective services to be displayed onto the display portion.

Thereby, in case of bringing at least one service into cooperation, user's service selection functions can be supported by notifying the user of executable recommended cooperation actions.

A service processing apparatus wherein the above described control unit displays onto the above described display portion the recommended cooperation actions subject to removal of nonexecutable cooperation actions.

Thereby, in case of bringing at least one service into cooperation, user's service selection functions can be supported by notifying the user of executable recommended cooperation actions.

A service processing apparatus wherein the above described cooperation information includes, as prohibited service information that will make it impossible to execute services to be executed if a service is being executed prior to execution of the service, recommended cooperation action information in combination with a plurality of services and the above described control unit displays onto the above described display portion the services subject to removal of the above described prohibited services.

Thereby, in case of bringing at least one service into cooperation, such an event that a service to be prohibited is selected can be prevented.

A service processing apparatus wherein the above described cooperation information includes a document format utilizable in a service and a document format after service execution; and the above described determining unit compares the above described utilizable document format with the above described document format after service execution during the course of executing the service to determine a display order subject to removal of not utilizable services from the display subjects.

Thereby, processing outcome of a service can be derived in a document format adjusted to the subject of the subsequent service.

A service processing apparatus of communicating between respective apparatuses with SOAP.

Thereby, between the respective service processing apparatuses, a system of implementing optimum service cooperation processing can be established.

This application claims priority from Japanese Patent Application No. 2005-041055 filed on Feb. 17, 2005, which is hereby incorporated by reference herein.

What is claimed is:

1. A service processing apparatus capable of communicating with respective apparatuses distributed on a network and utilizing, as service, functions providable at respective apparatuses, comprising:
   an obtaining unit adapted to obtain service information including cooperation information on individual services provided from respective apparatuses, the cooperation information indicating suitable combinations of functions provided by the services;
   a determining unit adapted to determine priorities of respective services to be displayed onto a display portion from cooperation information of respective services based on service information of respective apparatuses obtained by said obtaining unit;
   a control unit adapted to display respective services onto the display portion based on priorities determined by said determining unit;
   a requesting unit adapted to request, to respective apparatuses, execution of services displayed onto the display portion; and
   wherein said control unit changes display contents of services to be displayed next based on a selection state of services displayed on the display portion.

2. The service processing apparatus according to claim 1, wherein the cooperation information includes services that must be executed prior to execution of services, services that had better be executed prior to execution of services and services that had better be executed after execution of services.

3. The service processing apparatus according to claim 1, further comprising a changing unit adapted to change execution order of services displayed on the display portion,
   wherein said control unit changes the method of displaying the services displayed on the display portion if the execution order of the services are changed by said changing unit.

4. The service processing apparatus according to claim 1, wherein
   the cooperation information includes recommended cooperation action information in combination with a plurality of services; and
   said determining unit determines priorities of respective services to be displayed onto the display portion from recommended cooperation action information of respective services based on service information of respective apparatuses obtained by said obtaining unit.

5. The service processing apparatus according to claim 4, wherein said control unit displays onto the display portion the recommended cooperation actions subject to removal of nonexecutable recommended cooperation actions.

6. The service processing apparatus according to claim 5, wherein
   the cooperation information includes, as prohibited service information that will make it impossible to execute services if a service is executed prior to execution of the service, recommended cooperation action information in combination with a plurality of services; and
   said control unit displays onto the display portion the services subject to removal of the prohibited services.

7. The service processing apparatus according to claim 1, wherein
   the cooperation information includes a document format utilizable in a service and a document format after service execution; and
   said determining unit compares the utilizable document format with the document format after service execution during the course of executing the service to determine display order subject to removal of not utilizable services from display subjects.

8. The service processing apparatus according to claim 1, wherein communication between respective apparatuses is performed with SOAP.

9. A service display method in a service processing apparatus capable of communicating with respective apparatuses distributed on a network and utilizing, as service, functions providable at respective apparatuses, comprising:
- an obtaining step of obtaining service information including cooperation information on individual services provided from respective apparatuses, the cooperation information indicating suitable combinations of functions provided by the services;
- a determining step of determining priorities of respective services to be displayed onto a display portion from cooperation information of respective services based on service information of respective apparatuses obtained in said obtaining step;
- a control step of displaying respective services onto the display portion based on priorities determined in said determining step;
- a requesting step of requesting, to respective apparatuses, execution of services displayed onto the display portion; and
- wherein said control step changes display contents of services to be displayed next based on a selection state of services displayed on the display portion.

10. The service display method according to claim 9, wherein the cooperation information includes services that must be executed prior to execution of services, services that had better be executed prior to execution of services and services that had better be executed after execution of services.

11. A service display method according to claim 9, further comprising a changing step of changing execution order of services displayed on the display portion,
- wherein said control step changes the method of displaying the services displayed on the display portion if the execution order of the services is changed in said changing step.

12. The service display method according to claim 9, wherein
- the cooperation information includes recommended cooperation action information in combination with a plurality of services; and
- said determining step determines priorities of respective services to be displayed onto the display portion from recommended cooperation action information of respective services based on service information of respective apparatuses obtained in said obtaining step.

13. The service display method according to claim 12, wherein said control step displays onto the display portion the recommended cooperation actions subject to removal of non-executable recommended cooperation actions.

14. The service display method according to claim 13, wherein:
- the cooperation information includes, as prohibited service information that will make it impossible to execute services if a service is executed prior to execution of the service, recommended cooperation action information in combination with a plurality of services; and
- said control step displays onto the display portion the services subject to removal of the prohibited services.

15. The service display method according to claim 9, wherein
- the cooperation information includes a document format utilizable in a service and a document format after service execution; and
- said determining step compares the utilizable document format with the document format after service execution during the course of executing the service to determine display order subject to removal of not utilizable services from display subjects.

16. The service display method according to claim 9, wherein communication between respective apparatuses is performed with SOAP.

17. A computer-readable storage medium that stores a computer program for causing a computer to execute a service display method carried out in a service processing apparatus capable of communicating with respective apparatuses distributed on a network and utilizing, as service, functions providable at respective apparatuses, wherein the service display method comprises:
- an obtaining step of obtaining service information including cooperation information on individual services provided from respective apparatuses, the cooperation information indicating suitable combinations of functions provided by the services;
- a determining step of determining priorities of respective services to be displayed onto a display portion from cooperation information of respective services based on service information of respective apparatuses obtained in said obtaining step;
- a control step of displaying respective services onto the display portion based on priorities determined in said determining step;
- a requesting step of requesting, to respective apparatuses, execution of services displayed onto the display portion; and
- wherein said control step changes display contents of services to be displayed next based on a selection state of services displayed on the display portion.

18. A computer program stored on a computer-readable storage medium for causing a computer to execute a service display method in a service processing apparatus capable of communicating with respective apparatuses distributed on a network and utilizing, as service, functions providable at respective apparatuses, wherein said program comprises:
- an obtaining step of obtaining service information including cooperation information on individual services provided from respective apparatuses, the cooperation information indicating suitable combinations of functions provided by the services;
- a determining step of determining priorities of respective services to be displayed onto a display portion from cooperation information of respective services based on service information of respective apparatuses obtained in said obtaining step;
- a control step of displaying respective services onto the display portion based on priorities determined in said determining step;
- a requesting step of requesting, to respective apparatuses, execution of services displayed onto the display portion; and
- wherein said control step changes display contents of services to be displayed next based on a selection state of services displayed on the display portion.

* * * * *